(12) United States Patent
Higgs et al.

(10) Patent No.: US 10,140,729 B2
(45) Date of Patent: *Nov. 27, 2018

(54) DATA COMPRESSION FOR VISUAL ELEMENTS

(71) Applicant: 8i Limited, Wellington (NZ)

(72) Inventors: Robert James William Higgs, Wellington (NZ); Eugene Joseph d'Eon, Wellington (NZ)

(73) Assignee: 8i Limited, Wellington (NZ)

( * ) Notice: Subject to any disclaimer, the term of this patent is extended or adjusted under 35 U.S.C. 154(b) by 0 days.

This patent is subject to a terminal disclaimer.

(21) Appl. No.: 15/851,012

(22) Filed: Dec. 21, 2017

(65) Prior Publication Data
US 2018/0225844 A1 Aug. 9, 2018

Related U.S. Application Data

(63) Continuation of application No. 15/426,868, filed on Feb. 7, 2017, now Pat. No. 9,881,389.

(51) Int. Cl.
*G06T 9/40* (2006.01)
*G06T 15/08* (2011.01)
(Continued)

(52) U.S. Cl.
CPC ............... *G06T 9/40* (2013.01); *G06T 15/08* (2013.01); *G09G 5/393* (2013.01); *H04L 69/04* (2013.01);
(Continued)

(58) Field of Classification Search
CPC ........... G06T 9/40; G06T 15/08; G09G 5/393; G09G 2340/02; G09G 2350/00; H04L 69/04
(Continued)

(56) References Cited

U.S. PATENT DOCUMENTS 9,224,235 B2 * 12/2015 Sevastiyanov .......... G06T 15/06
9,881,389 B1 1/2018 Higgs
(Continued)

OTHER PUBLICATIONS

"U.S. Appl. No. 15/426,868, Notice of Allowance dated Sep. 29, 2017".

(Continued)

*Primary Examiner* — Jacinta M Crawford
(74) *Attorney, Agent, or Firm* — Schwegman Lundberg & Woessner, P.A.

(57) ABSTRACT

A machine is configured to perform data compression or data decompression with respect to visual elements, such as two-dimensional pixels of an image or three-dimensional voxels of a hologram. The machine accesses a set of visual elements and performs compression on the set by generating a bounded volume hierarchy of nodes. After the bounded volume hierarchy has been generated, with or without modification, the machine provides a compressed version of the set by providing at least a portion of the bounded volume hierarchy. The same machine or another machine accesses a compressed first representation of the set by accessing at least part of the bounded volume hierarchy. The machine may perform partial decompression of the first representation by generating a second representation of the set, based on only a portion of the bounded volume hierarchy. The machine then causes rendering and display of the second representation.

20 Claims, 16 Drawing Sheets

(51) Int. Cl.
    *H04L 29/06*     (2006.01)
    *G09G 5/393*     (2006.01)

(52) U.S. Cl.
    CPC ..... *G09G 2340/02* (2013.01); *G09G 2350/00* (2013.01)

(58) Field of Classification Search
    USPC .................................................. 345/418, 419
    See application file for complete search history.

(56) References Cited

U.S. PATENT DOCUMENTS

| | | | |
|---|---|---|---|
| 2016/0071312 A1* | 3/2016 | Laine ................... | G06T 15/005 345/419 |
| 2016/0071313 A1* | 3/2016 | Laine ..................... | G06T 15/10 345/419 |
| 2017/0116760 A1* | 4/2017 | Laine ........................ | G06T 9/40 |
| 2017/0178387 A1* | 6/2017 | Woop .................... | G06T 15/005 |

OTHER PUBLICATIONS

Kim, et al., "RACBVHs: Random-Accessible Compressed Bounding Volume Hierarchies", IEEE Transactions on Visualization and Computer Graphics , vol. 16 No. 2, (Mar./Apr. 2010), 273-286.

* cited by examiner

US 10,140,729 B2

DATA COMPRESSION FOR VISUAL ELEMENTS

RELATED APPLICATION

This application is a continuation of, and claims the priority benefit of, U.S. patent application Ser. No. 15/426,868, filed on Feb. 7, 2017, which is incorporated herein by reference in its entirety.

TECHNICAL FIELD

The subject matter disclosed herein generally relates to the technical field of special-purpose machines that facilitate data compression, including software-configured computerized variants of such special-purpose machines and improvements to such variants, and to the technologies by which such special-purpose machines become improved compared to other special-purpose machines that facilitate data compression. Specifically, the present disclosure addresses systems and methods to facilitate data compression for visual elements.

BACKGROUND

A machine may be configured to perform data compression, data decompression, or both. In some implementations, one machine (e.g., a server machine, which may be part of a server system of multiple machines) performs data compression on an uncompressed data structure and then provides a compressed version of the data structure to another machine (e.g., a client device) that is configured to perform full data decompression on the compressed version of the data structure and thereby reconstruct the uncompressed data structure in its entirety. In some situations, the data structure represents visual elements (e.g., pixels within a two-dimensional rendered image or voxels within a three-dimensional hologram or other three-dimensional rendered volumetric model).

BRIEF DESCRIPTION OF THE DRAWINGS

Some embodiments are illustrated by way of example and not by way of limitation in the figures of the accompanying drawings.

DETAILED DESCRIPTION

Figure 1:
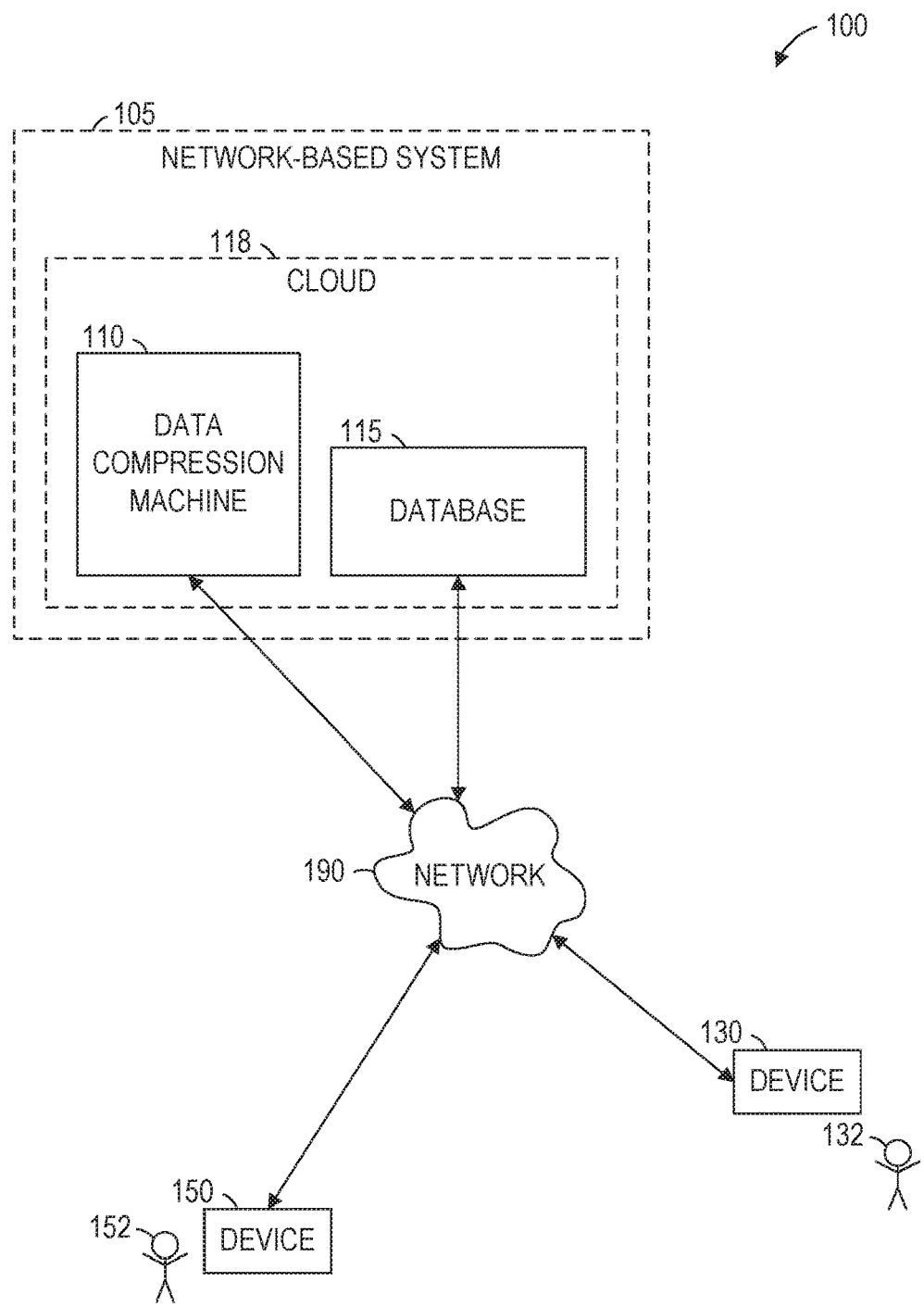
FIG. 1 is a network diagram illustrating a network environment suitable for data compression, according to some example embodiments.

Example methods (e.g., algorithms) facilitate data compression for visual elements, corresponding data decompression, or both, and example systems (e.g., special-purpose machines configured by special-purpose software) are configured to facilitate data compression for visual elements, corresponding data decompression, or both. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of various example embodiments. It will be evident to one skilled in the art, however, that the present subject matter may be practiced without these specific details.

A machine is configured (e.g., by software, in accordance with one or more of the methodologies discussed herein) to perform data compression, data decompression, or both, with respect to a data structure that represents visual elements (e.g., pixels within a two-dimensional rendered image or voxels within a three-dimensional hologram or other three-dimensional rendered volumetric model) that collectively represent visual information (e.g., viewable by humans, machines, or both). The machine accesses a set of visual elements (e.g., an array of pixels or voxels) that corresponds to an arrangement (e.g., a graphical layout in two or three dimensions) of the visual elements. Each visual element has a different relative location within the arrangement. Each visual element also specifies a corresponding value of an attribute, and the values of the attribute vary among the visual elements (e.g., within a range between minimum and maximum values of the attribute). Examples of such an attribute include color, transparency, reflectivity, surface normal vector, and motion vector, and the attribute may be specified multiple times for a single visual element (e.g., multiple colors that are each from a different camera or camera position).

The machine performs data compression on the set of visual elements by generating a bounded volume hierarchy of nodes. In the bounded volume hierarchy, a parent node represents a subset of the visual elements, and the parent node may have multiple child nodes. Furthermore, the parent node indicates or otherwise defines a corresponding representative value of the attribute (e.g., an average or median of attribute values indicated or otherwise defined by its child nodes). In some example embodiments, each child node indicates or otherwise defines a respectively corresponding offset from the representative value, and the representative value is generated (e.g., calculated) based on the offsets collectively indicated or otherwise defined by the child nodes. In alternative example embodiments, the parent node additionally has a representative child node that indicates or otherwise defines a representative offset from the representative value. In such alternative example embodiments, each child node indicates or otherwise defines a respectively corresponding offset from the representative offset, which itself is an offset from the representative value, and the representative value is generated based on the offsets collectively indicated or otherwise defined by the child nodes and further based on the representative offset indicated or otherwise defined by the representative child node. One or both of these techniques may provide the technical effect of improving data compression by improving the performance of entropy encoding algorithms applied to the bounded volume hierarchy (e.g., with or without subsequent modifications).

In certain example embodiments, the machine also modifies the generated bounded volume hierarchy (e.g., during the data compression or as a postprocessing operation thereof). This modification may include quantizing values (e.g., representative values, offset values, and representative offsets), thresholding values (e.g., clamping values to an extreme value, such as a minimum value or a maximum value), or both.

After the bounded volume hierarchy has been generated, with or without modification, the machine provides a data-compressed version of the set of visual elements by providing at least a portion of the bounded volume hierarchy. For example, the machine may provide the data-compressed version to a database for storage or to another machine (e.g., a device) for decompression, rendering, and display.

Accordingly, a machine (e.g., a device) may be configured (e.g., by software, in accordance with one or more of the methodologies discussed herein) to perform full or partial data decompression of the data-compressed version of the set of visual elements. The machine accesses at least part of the bounded volume hierarchy discussed above. That is, the machine accesses a data-compressed first representation of the set of visual elements, where first representation is or includes the above-discussed bounded volume hierarchy (e.g., with or without postprocessing or other modification). The first representation may be accessed from a database or received from another machine (e.g., a server machine).

As noted above, the parent node indicates or otherwise defines a corresponding representative value of the attribute. In some example embodiments, the parent node has child nodes that each indicate or otherwise define a respectively corresponding offset from the representative value. In alternative example embodiments, the parent node additionally has a representative child node that indicates or otherwise defines a representative offset from the representative value, and each child node indicates or otherwise defines a respectively corresponding offset from the representative offset. As noted above, the representative value was previously generated based on the offsets collectively indicated or otherwise defined by the child nodes, and the generation of the representative value may have been further based on the representative offset indicated or otherwise defined by the representative child node.

When configured in accordance with one or more of the methodologies discussed herein, the machine is able to perform full or partial data decompression on the first representation. Moreover, the machine may be constrained (e.g., by user request or according to software rules) to perform partial data decompression on the first representation by generating a second representation of the set of visual elements, where the second representation is generated based on only a portion of the accessed bounded volume hierarchy (e.g., modified after generation or unmodified after generation). In particular, the portion includes a parent node but omits its corresponding child nodes, and the partial decompression accordingly processes the parent node but not its child nodes.

After the first representation has been at least partially decompressed, the machine causes display of the at least partially decompressed first representation. This is performed by causing rendering and display of the second representation that was generated based on only the portion of the bounded volume hierarchy (e.g., the portion in which the parent node is included but its child nodes are excluded). For example, the machine may cause its own graphics rendering hardware to render the second representation and cause its own display hardware to display the rendered second representation. As another example, the machine may cause one or more other machines (e.g., a display device, or multiple devices belonging to multiple users) to perform such operations. Additional details are discussed below.

FIG. 1 is a network diagram illustrating a network environment 100 suitable for the data compression and decompression methodologies discussed herein, according to some example embodiments. The network environment 100 includes a data compression machine 110, a database 115, and devices 130 and 150, all communicatively coupled to each other via a network 190. The data compression machine 110, with or without the database 115, may form all or part of a cloud 118 (e.g., a geographically distributed set of multiple machines configured to function as a single server), which may form all or part of a network-based system 105 (e.g., a cloud-based server system configured to provide one or more network-based services to the devices 130 and 150). The data compression machine 110 and the devices 130 and 150 may each be implemented in a special-purpose (e.g., specialized) computer system, in whole or in part, as described below with respect to FIG. 16.

Also shown in FIG. 1 are users 132 and 152. One or both of the users 132 and 152 may be a human user (e.g., a human being), a machine user (e.g., a computer configured by a software program to interact with the device 130 or 150), or any suitable combination thereof (e.g., a human assisted by a machine or a machine supervised by a human). The user 132 is associated with the device 130 and may be a user of the device 130. For example, the device 130 may be a desktop computer, a vehicle computer, a tablet computer, a navigational device, a portable media device, a smart phone, or a wearable device (e.g., a smart watch, smart glasses, smart clothing, or smart jewelry) belonging to the user 132. Likewise, the user 152 is associated with the device 150 and may be a user of the device 150. As an example, the device 150 may be a desktop computer, a vehicle computer, a tablet computer, a navigational device, a portable media device, a smart phone, or a wearable device (e.g., a smart watch, smart glasses, smart clothing, or smart jewelry) belonging to the user 152.

Any of the systems or machines (e.g., databases and devices) shown in FIG. 1 may be, include, or otherwise be implemented in, a special-purpose (e.g., specialized or otherwise non-conventional and non-generic) computer that has been modified to perform one or more of the functions described herein for that system or machine (e.g., configured or programmed by special-purpose software, such as one or more software modules of a special-purpose application, operating system, firmware, middleware, or other software program). For example, a special-purpose computer system able to implement any one or more of the methodologies described herein is discussed below with respect to FIG. 16, and such a special-purpose computer may accordingly be a means for performing any one or more of the methodologies discussed herein. Within the technical field of such special-purpose computers, a special-purpose computer that has been specially modified (e.g., configured by special-purpose software) by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the systems or machines illustrated in FIG. 1 may be combined into a single system or machine, and the functions described herein for any single system or machine may be subdivided among multiple systems or machines.

The network 190 may be any network that enables communication between or among systems, machines, databases, and devices (e.g., between the data compression machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., a WiFi network or WiMax network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
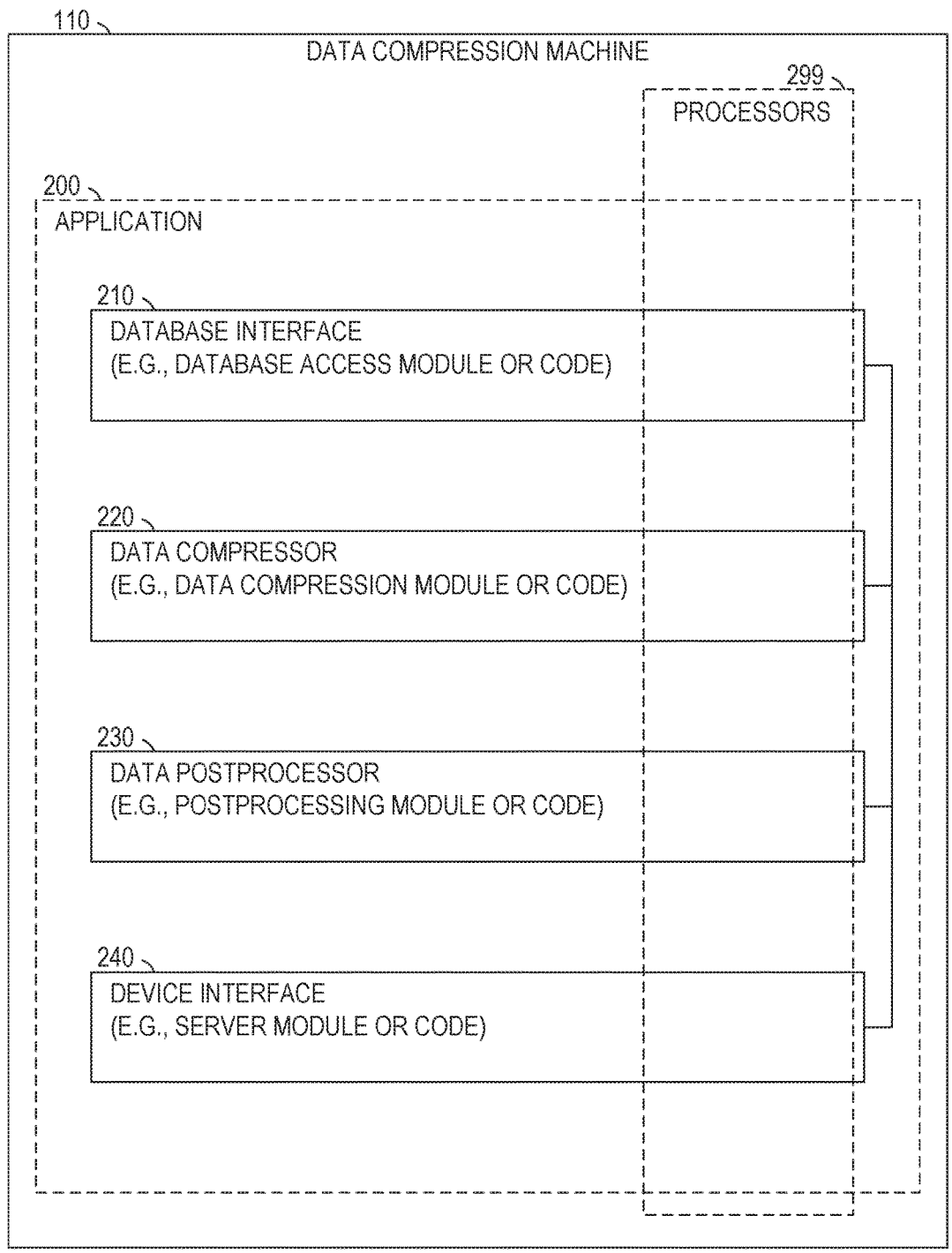
FIG. 2 is a block diagram illustrating components of a data compression machine, according to some example embodiments.

FIG. 2 is a block diagram illustrating components of the data compression machine 110, according to some example embodiments. The data compression machine 110 is shown as including a database interface 210, a data compressor 220, a data postprocessor 230, and a device interface 240, all configured to communicate with each other (e.g., via a bus, shared memory, or a switch).

The database interface 210 may be or include a database access module or other suitable code. The data compressor 220 may be or include a data compression module or other suitable code. The data postprocessor 230 may be or include a postprocessing module or other suitable code, and the device interface 240 eight be or include a server module or other suitable code.

As shown in FIG. 2, any one or more of the database interface 210, the data compressor 220, the data postprocessor 230, and the device interface 240 may form all or part of an application 200 (e.g., a programmatic software application) that is stored (e.g., installed) on the data compression machine 110. Furthermore, one or more processors 299 (e.g., hardware processors, digital processors, or any suitable combination thereof) may be included (e.g., temporarily or permanently) in the application 200, the database interface 210, the data compressor 220, the data postprocessor 230, the device interface 240, or any suitable combination thereof.

Figure 3:
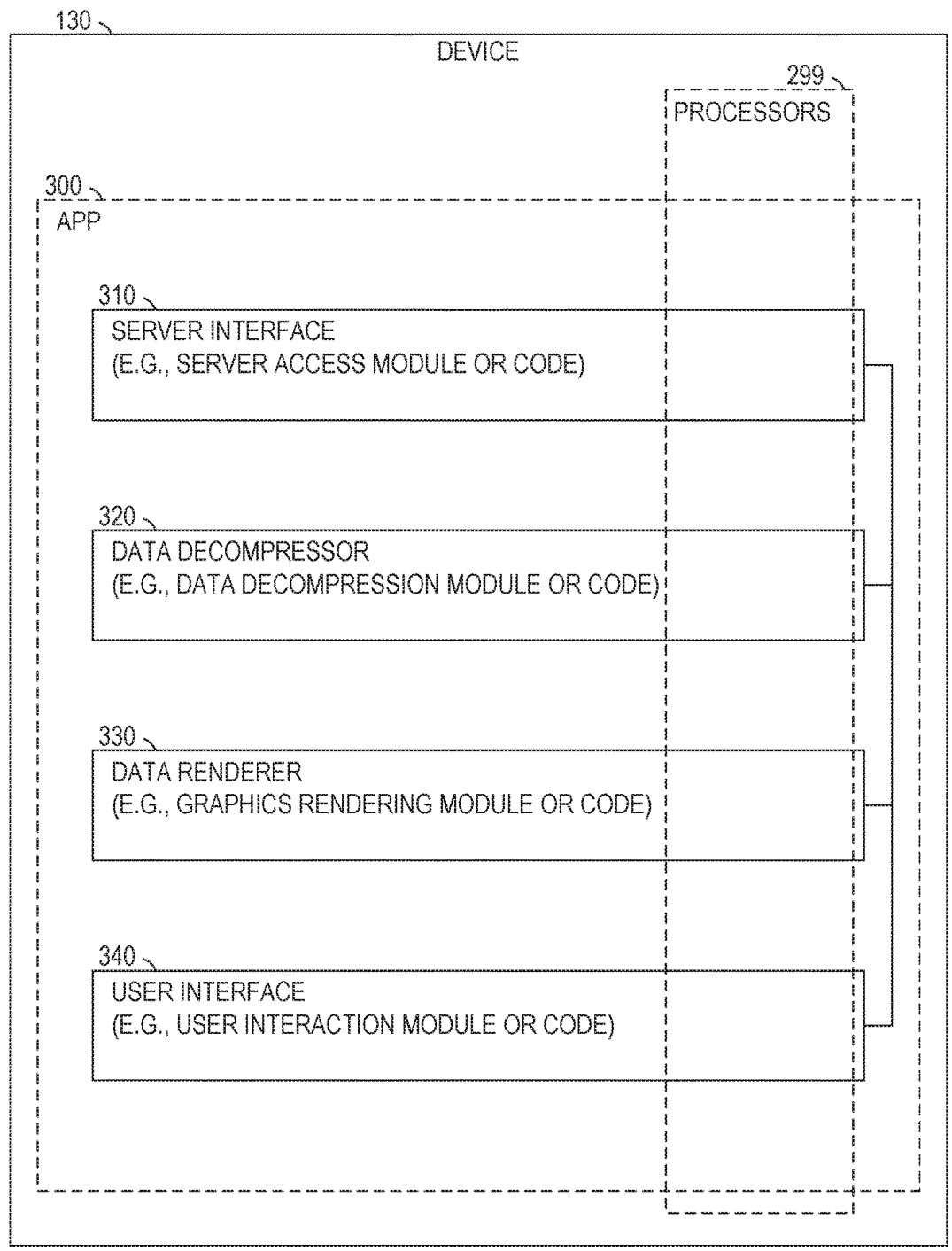
FIG. 3 is a block diagram illustrating components of a device suitable for data decompression, according to some example embodiments.

FIG. 3 is a block diagram illustrating components of the device 130, according to some example embodiments. One or more other devices (e.g., device 150) in the network 190 may be similarly configured to perform operations similar to those described herein for the device 130. The device 130 is shown as including a server interface 310, a data decompressor 320, a data renderer 330, and a user interface 340, all configured to communicate with each other (e.g., via a bus, shared memory, or a switch).

The server interface 310 may be or include a server access module or other suitable code. The data decompressor 320 may be or include a data decompression module or other suitable code. The data renderer 330 may be or include a graphics rendering module or other suitable code, and the user interface 340 may be or include a user interaction module or other suitable code.

As shown in FIG. 3, any one or more of the server interface 310, the data decompressor 320, the data renderer 330, and the user interface 340 may form all or part of an app 300 (e.g., a mobile app) that is stored (e.g., installed) on the device 130 (e.g., responsive to or otherwise as a result of data being received from the data compression machine 110 or the database 115 via the network 190). Furthermore, one or more processors 299 (e.g., hardware processors, digital processors, or any suitable combination thereof) may be included (e.g., temporarily or permanently) in the app 300, the server interface 310, the data decompressor 320, the data renderer 330, the user interface 340, or any suitable combination thereof.

Any one or more of the components (e.g., modules) described herein may be implemented using hardware alone (e.g., one or more of the processors 299) or a combination of hardware and software. For example, any component described herein may physically include an arrangement of one or more of the processors 299 (e.g., a subset of or among the processors 299) configured to perform the operations described herein for that component. As another example, any component described herein may include software, hardware, or both, that configure an arrangement of one or more of the processors 299 to perform the operations described herein for that component. Accordingly, different components described herein may include and configure different arrangements of the processors 299 at different points in time or a single arrangement of the processors 299 at different points in time. Each component (e.g., module) described herein is an example of a means for performing the operations described herein for that component. Moreover, any two or more components described herein may be combined into a single component, and the functions described herein for a single component may be subdivided among multiple components. Furthermore, according to various example embodiments, components described herein as being implemented within a single system or machine (e.g., a single device) may be distributed across multiple systems or machines (e.g., multiple devices).

Figure 4:
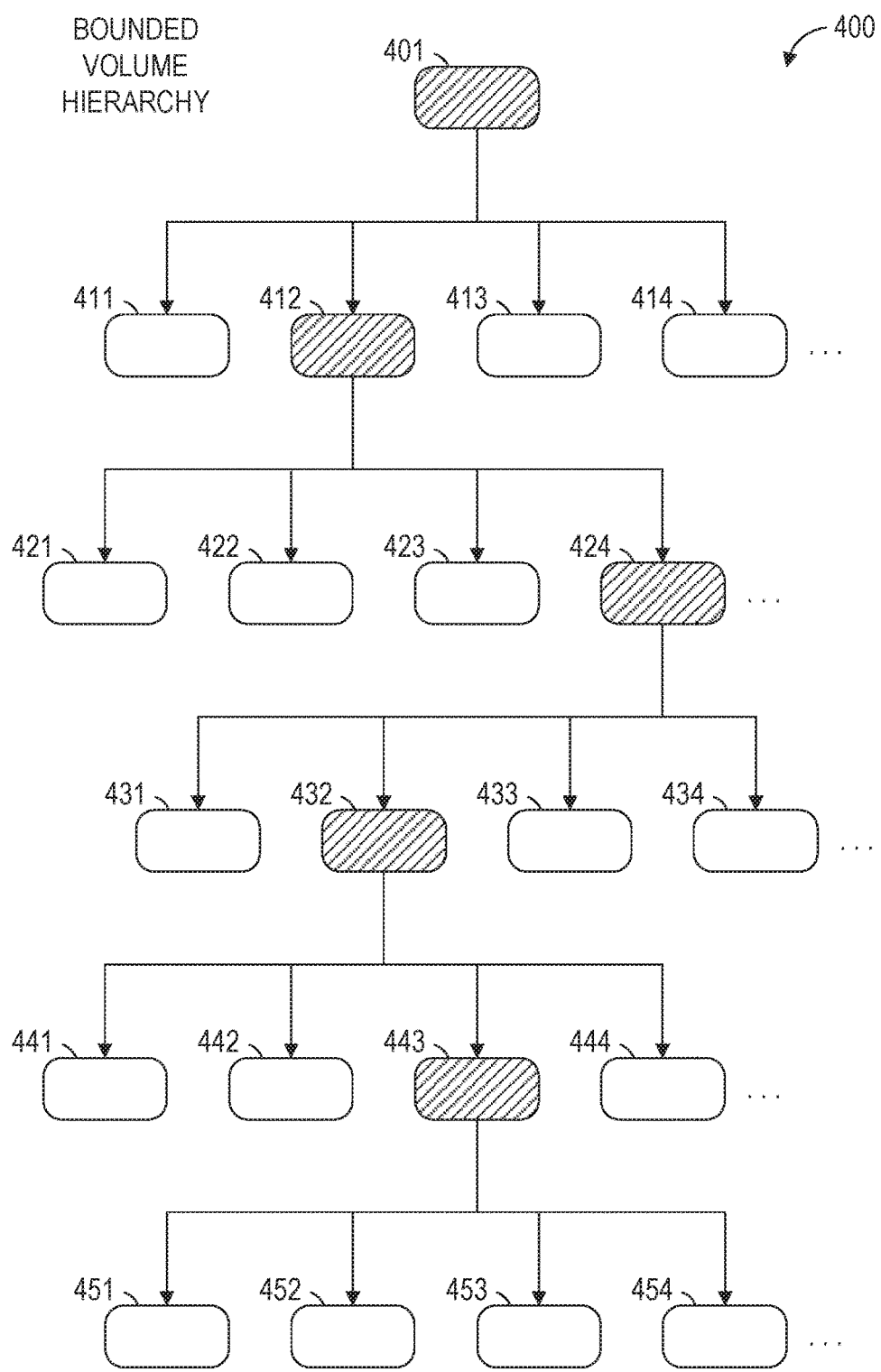
FIG. 4 is a block diagram illustrating portions of a bounded volume hierarchy, according to some example embodiments.

FIG. 4 is a block diagram illustrating portions of a bounded volume hierarchy 400, according to some example embodiments. As used herein, "bounded volume hierarchy"

is a data structure arranged as a hierarchical tree of nodes that represents a set of visual elements (e.g., pixels of a two-dimensional image or a set of geometric objects, such as voxels of a three-dimensional hologram). The phrase "bounded volume hierarchy" may also be referred to as a "bounding volume hierarchy," and the two phrases may be used interchangeably in the context of the present disclosure.

In the bounded volume hierarchy 400, all of the represented visual elements are contained in bounded volumes (also called bounding volumes) that are represented by leaf nodes in a hierarchical tree of nodes, and these leaf nodes are grouped into larger bounded volumes represented by parent nodes, grandparent nodes, great grandparent nodes, and so on. A root node represents the entirety of all represented visual elements. Each leaf node represents a smallest-size subset of the visual elements. For example, each leaf node may represent a single visual element from the represented set of visual elements (e.g., a single pixel from a two-dimensional image or a single voxel from a three-dimensional hologram). The bounded volume hierarchy 400 enables or enhances various computer graphics operations (e.g., facilitating elimination of potential intersection candidates in a scene to be rendered by omitting all visual elements contained in bounded volumes that are occluded or otherwise to be omitted from rendering).

Accordingly, as shown in FIG. 4, the node 401 is the root node of the bounded volume hierarchy 400 and is the parent node for multiple child nodes (e.g., nodes 411 412, 413 and 414). The node 412 is a child node of the root node 401, as well as the parent node to multiple child nodes (e.g., nodes 421, 422, 423, and 424). The node 424 is a child node with respect to node 412, as well as the parent node of multiple child nodes (e.g., nodes 431, 432, 433, and 434). The node 432 is a child of node 424, as well as the parent of multiple child nodes (e.g., nodes 441, 442, 443, and 444). The node 443 is a child node of node 432, as well as the parent node for multiple child nodes (e.g., nodes 451, 452, 453, and 454), which may be leaf nodes of the bounded volume hierarchy 400. Although FIG. 4 shows the bounded volume hierarchy 400 as having a six-layer tree structure, from the root node 401 to the leaf nodes (e.g., nodes 451-454), the bounded volume hierarchy 400 may have more or fewer layers and more or fewer nodes, depending on implementation and the complexity of the visual elements represented.

In some example embodiments, information on two-dimensional visual elements (e.g., pixels within an image) are represented in quadtree form, and the bounded volume hierarchy 400 may accordingly take the form of a quadtree data structure (e.g., with each parent node having four child nodes, with or without an additional representative child node). In certain example embodiments, information on three-dimensional visual elements (e.g., voxels within a hologram or other three-dimensional model) are represented in octree form, and the bounded volume hierarchy 400 may accordingly take the form of an octree data structure (e.g., with each parent having a child nodes, with or without an additional representative child node).

Figure 5:
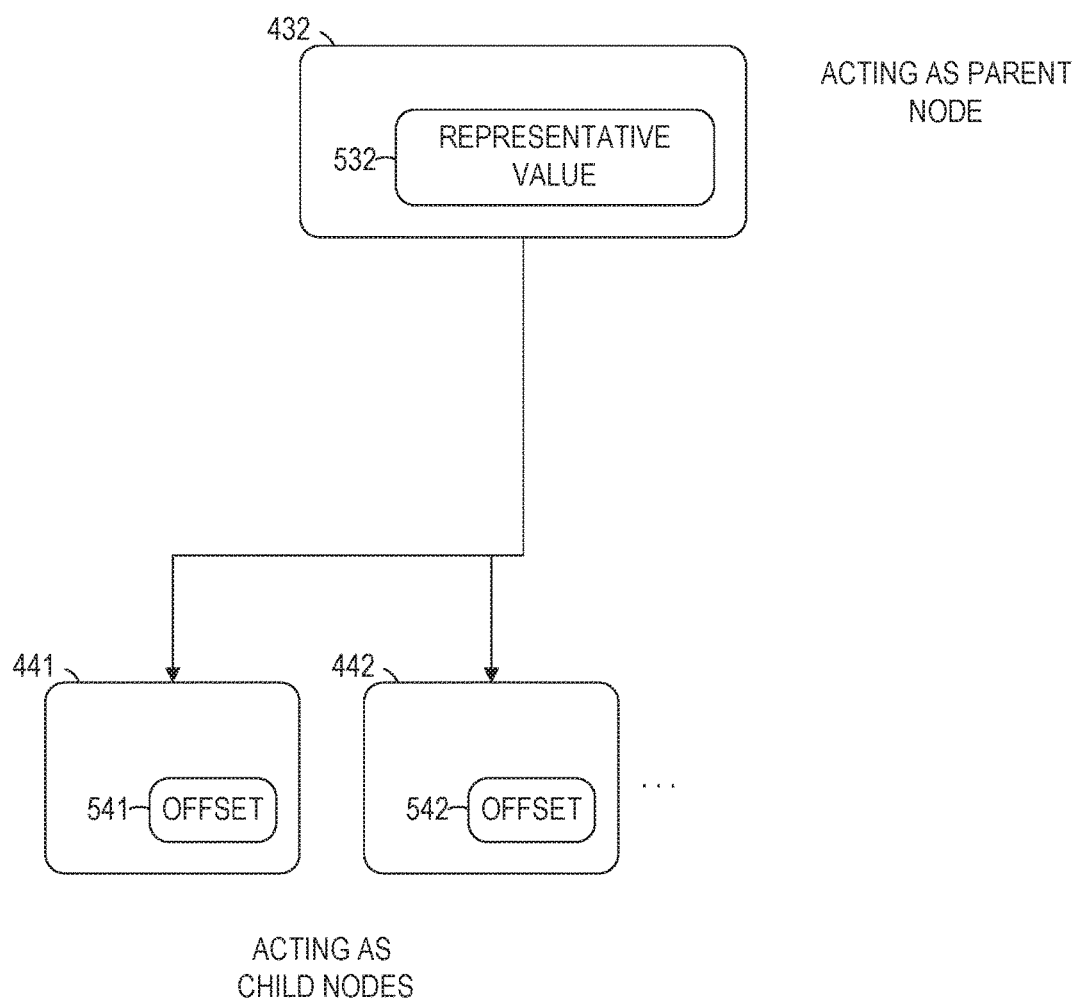
FIG. 5 is a block diagram illustrating an enlarged portion of the bounded volume hierarchy, according to some example embodiments.

FIG. 5 is a block diagram illustrating an enlarged portion of the bounded volume hierarchy 400, according to some example embodiments. Any one or more nodes of the bounded volume hierarchy 400 may store information that fully or partially defines a value of an attribute that varies among the visual elements represented by the bounded value hierarchy 400 (e.g., an attribute such as color, transparency, reflectivity, surface normal, or motion vector).

According to some example embodiments, multiple values of the attribute are fully or partially defined for any given node. For example, multiple values for color may be stored, indicated, or otherwise specified for a single node (e.g., a different set of color values for each camera among a group of multiple cameras, or a different color palette value for each camera among the group of multiple cameras). As another example, multiple values for transparency may be stored for a single node (e.g., a different alpha value for each camera among the group of multiple cameras). As a further example, multiple values for reflectivity may be stored for a single node (e.g., a different reflectance value for each camera among a group of multiple cameras). In situations where each of multiple values of the attribute for a node corresponds to a different camera, the corresponding camera may be identified by a camera identifier (e.g., a camera number, camera name, or camera location in two or three dimensions), and the camera identifier may be stored with the corresponding value.

As shown in FIG. 5, the node 432 (e.g., acting as a parent node) stores a representative value 532; the node 441 (e.g., a first node, acting as a child node of node 432) stores an offset 541 (e.g., a first offset or first offset value) from the representative value 532; and the node 442 (e.g., a second note, acting as another child node of node 432) stores an offset 542 (e.g., a second offset or second offset value) from the representative value 532. Moreover, the representative value 532 is generated based on (e.g., at least) the offsets 541 and 542 (e.g., the first and second offsets) that are collectively indicated by the nodes 441 and 442 (e.g., the first and second child nodes of the parent node 432).

More generally, any parent node (e.g., any node that has a parent relationship with a child node) can store a representative value (e.g., representative value 532) that is generated based on offset values of one or more child nodes (e.g., based on at least two child nodes of the parent node or based on all child nodes of the parent node). For example, the representative value 532 may be an average or median of the offsets 541 and 542, and the offsets 541 and 542 may each indicate a separate deviation from that average or median. In practice, such deviations tend to be small, and offsets (e.g., offsets 541 and 542) tend to average to zero or near zero. Accordingly, this may have the technical effect of reducing the amount of data (e.g., bits) to be allocated for storing attribute information in the child nodes 441 and 442 (e.g., among other child nodes of the parent node 432), as compared to storing absolute attribute values for the child nodes 441 and 442.

In some example embodiments, the offsets 541 and 542 are additive in nature. That is, the offsets 541 and 542 can be positive or negative numbers (e.g., scalar values) that each represent a separate absolute deviation (e.g., differential value or delta) in the attribute from the representative value 532 stored by its parent node 432. Thus, the offset 541 may be a positive or negative number that specifies an absolute change in the value of the attribute by the node 441 (e.g., first child node) away from the representative value 532. Accordingly, when added to the representative value 532, the offset 541 may fully or partially define the actual (e.g., absolute) value of the attribute for the node 441 (e.g., first child node). That is, an arithmetic sum of the representative value 532 and the offset 541 may fully or partially specify the absolute value of the attribute for the node 441. Similarly, the offset 542 may be a positive or negative number that specifies a change in the value of the attribute by the node 442 (e.g., second child node) away from the representative value 532, and accordingly, when added to the representative value 532, the offset 542 may fully or partially define the actual value of the attribute for the node 442 (e.g., second child node). That is, an arithmetic sum of the representative value 532 and the offset 542 may fully or partially specify the absolute value of the attribute for the node 442.

In certain example embodiments, the offsets 541 and 542 are multiplicative (e.g., proportional) in nature. That is, the offsets 541 and 542 can be positive or negative numbers (e.g., scalar coefficients) that each represent a separate proportional deviation (e.g., differential percentage) in the attribute from the representative value 532 stored by its parent node 432. Thus, the offset 541 may be a positive or negative number that specifies a proportional change in the value of the attribute by the node 441 (e.g., first child node) away from the representative value 532. Accordingly, when multiplied to the representative value 532, the offset 541 may fully or partially define the actual (e.g., absolute) value of the attribute for the node 441 (e.g., first child node). That is, a multiplicative product of the representative value 532 and the offset 541 may fully or partially specify the absolute value of the attribute for the node 441. Similarly, the offset 542 may be a positive or negative number that specifies a proportional change in the value of the attribute by the node 442 (e.g., second child node) away from the representative value 532, and accordingly, when multiplied to the representative value 532, the offset 542 may fully or partially define the actual value of the attribute for the node 442 (e.g., second child node). That is, a multiplicative product of the representative value 532 and the offset 542 may fully or partially specify the absolute value of the attribute for the node 442.

Figure 6:
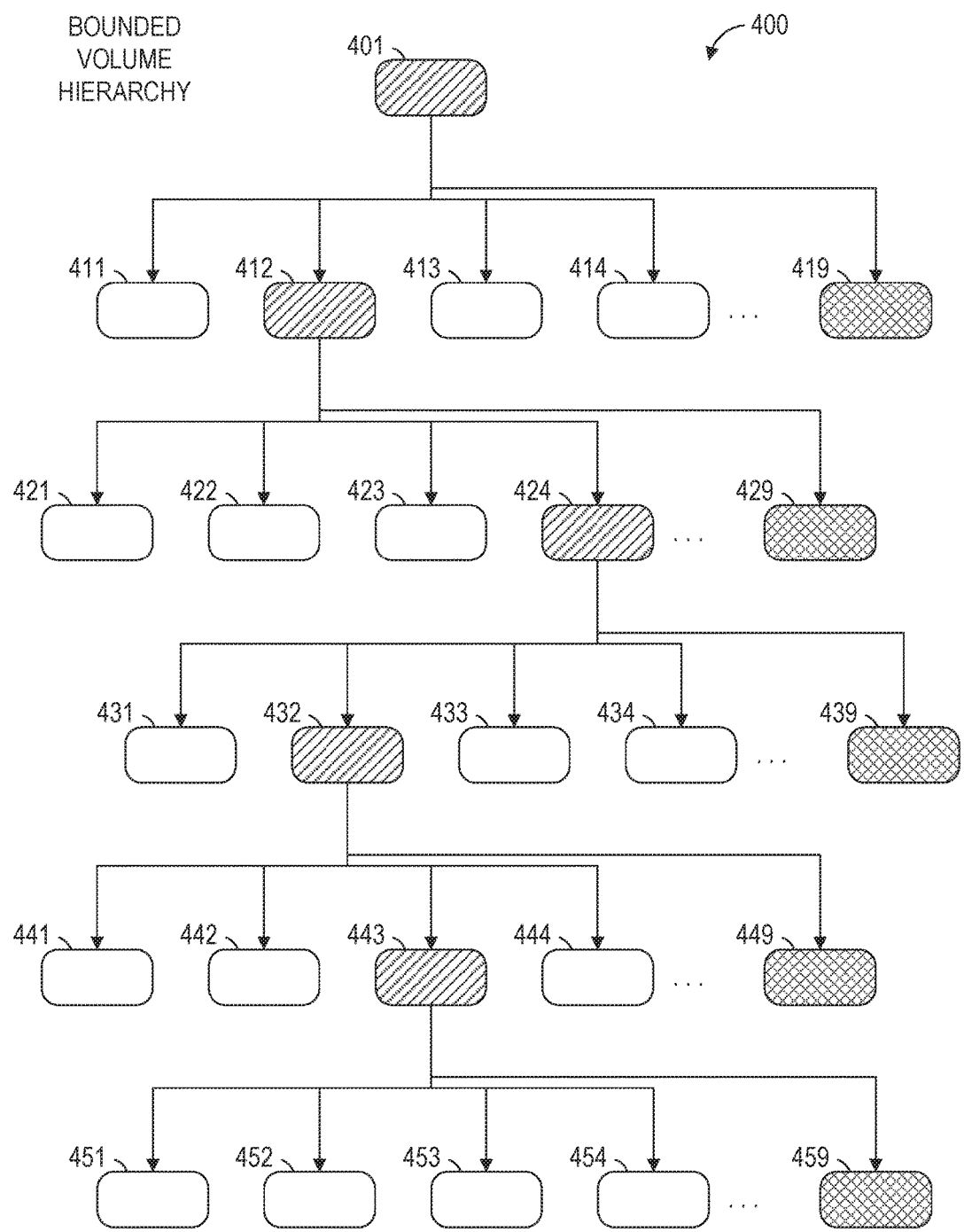
FIG. 6 is a block diagram illustrating portions of the bounded volume hierarchy, according to certain example embodiments.

FIG. 6 is a block diagram illustrating portions of the bounded volume hierarchy 400, according to certain example embodiments. According to such example embodiments, the bounded volume hierarchy 400 is configured in a manner similar to that described above with respect to FIGS. 4 and 5, with the addition of representative child nodes (e.g., representative child nodes 419, 429, 439, 449, and 459). Thus, the node 419 is a representative child node of its parent node 401 (e.g., the root node) and may be the sole representative child node of its parent node 401. The node 429 is a representative child node of its parent node 412 and may be the sole representative child node of its parent node 412. The node 439 is a representative child node of its parent node 424 and may be the sole representative child node of its parent node 424. The node 449 is a representative child node of its parent node 432 and may be the sole representative child node of its parent node 432. The node 459 is a representative child node (e.g., a leaf representative child node) of its parent node 443 and may be the sole representative child node of its parent node 443.

Generally, a representative child node (e.g., representative child nodes 419, 429, 439, 449, at 459) does not represent an actual bounded volume that contains any visual elements represented in the bounded volume hierarchy 400. Instead, a representative child node (which may be called a "hero" child node) stores information that is collectively representative of all offsets (e.g., offsets 541 and 542) stored collectively by all child nodes of the parent node (e.g., stores information regarding its sibling child nodes). This is illustrated in FIG. 7.

Figure 7:
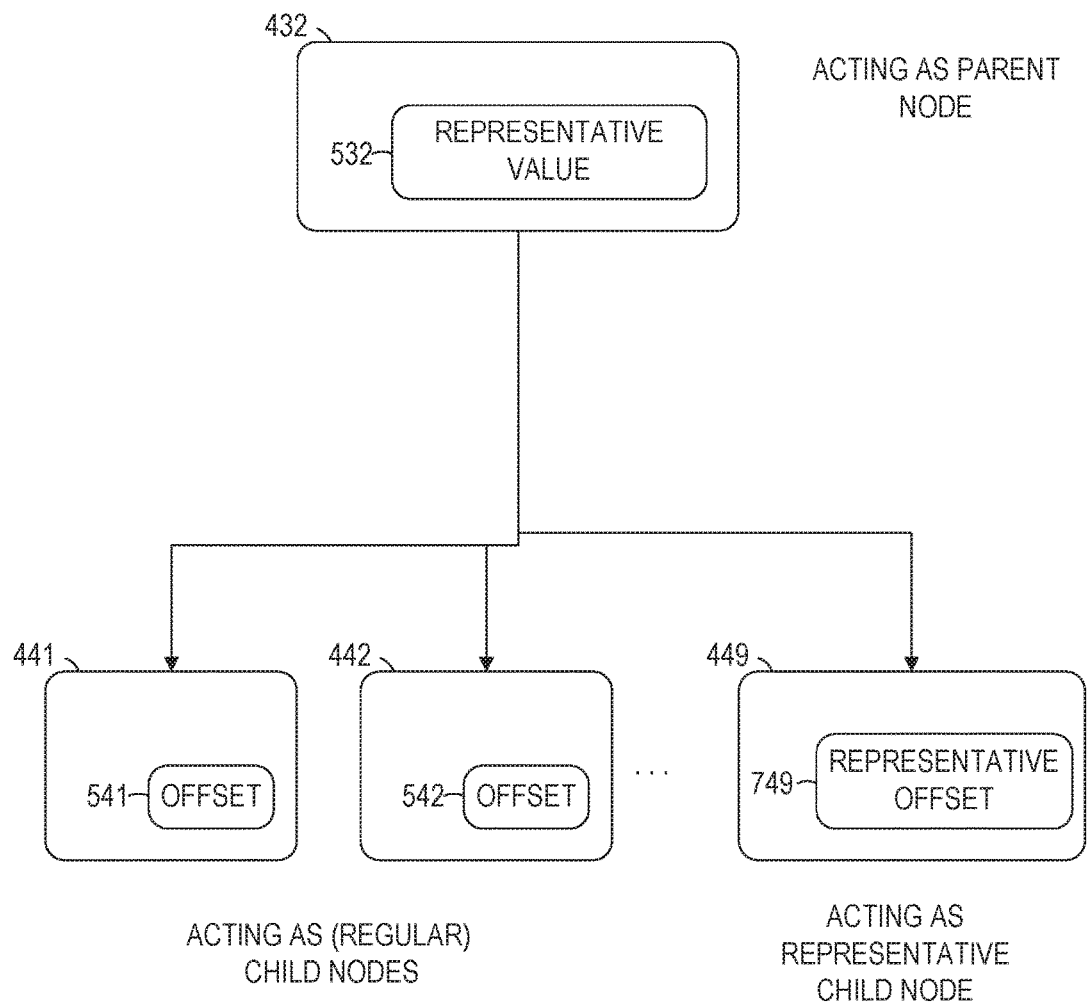
FIG. 7 is a block diagram illustrating an enlarged portion of the bounded volume hierarchy, according to certain example embodiments.

FIG. 7 is a block diagram illustrating an enlarged portion of the bounded volume hierarchy 400, according to example embodiments that implement representative child nodes (e.g., hero child nodes, such as nodes 419, 429, 439, 449, and 459). The enlarged portion is configured in a manner similar to that described above with respect to FIG. 5, except that the node 432 (e.g., acting as parent node) has the representative child node 449 (e.g., acting as a sibling node of first and second child nodes 441 and 442). The representative child node 449 stores a representative offset 749 from the representative value 532. In such example embodiments, the first offset 541 is an offset (e.g., deviation) from the representative offset 749, rather than from the representative value 532. Similarly, the second offset 542 is an offset from the representative offset 749, instead of an offset from the representative value 532. For example, the representative value 532 may be an average or median of initial values of the offsets 541 and 542, but for data compression purposes, an average or median of these initial values may be stored as the representative offset 749, and the actual offsets 541 and 542 may each indicate a separate deviation from the representative offset 749. This may have the technical effect of further reducing the amount of data to be allocated for storing attribute information in the child nodes 441 and 442 (e.g., among other child nodes of the parent node 432).

In some example embodiments the representative offset 749 is additive in nature. Accordingly, the representative offset 749 can be a positive or negative number (e.g., scalar value) that represents an absolute deviation from the representative value 532 stored by its parent node 432. Thus, the representative offset 749 may be a positive or negative number that specifies an absolute change in the value of the attribute collectively by the other child nodes (e.g., nodes 441-444) of the parent node 432. Accordingly, when the representative value 532, the representative offset 749, and the offset 541 (e.g., first offset) are added together, the resulting arithmetic sum may fully or partially define the actual (e.g., absolute) value of the attribute for the node 441 (e.g., first child node). Similarly, when the representative value 532, the representative offset 749, and the offset 542 (e.g., second offset) are added together, the resulting arithmetic sum may fully or partially define the actual (e.g., absolute) value of the attribute for the node 442 (e.g., second child node).

In certain example embodiments, the representative offset 749 is multiplicative (e.g., proportional) in nature. Accordingly, the representative offset 749 can be a positive or negative number (e.g., a scalar coefficient) that represents a proportional deviation (e.g., differential percentage) in the attribute from the representative value 532 stored by its parent node 432. Thus, the representative offset 749 may be a positive or negative number that specifies a proportional change in the value of the attribute collectively by the other child nodes (e.g., nodes 441-444) of the parent node 432. Accordingly, when the representative value 532, the representative offset 749, and the offset 541 are multiplied together, the resulting multiplicative product may fully or partially define the actual (e.g., absolute) value of the attribute for the node 441 (e.g., first child node). Likewise, when the representative value 532, the representative offset 749, and the offset 542 are multiplied together, the resulting multiplicative product may fully or partially define the actual (e.g., absolute) value of the attribute for the node 442 (e.g., second child node).

Figure 8:
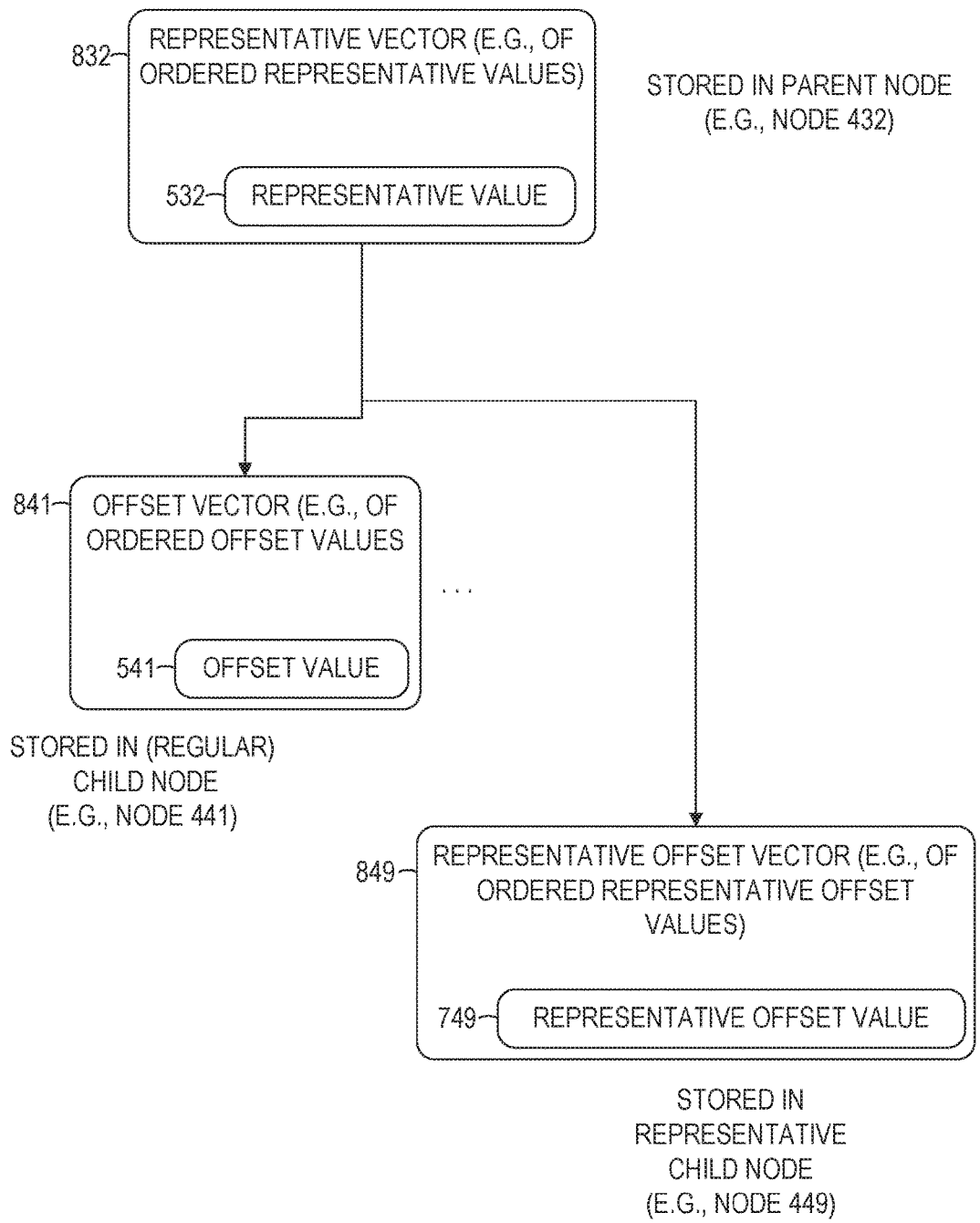
FIG. 8 is a block diagram illustrating data stored in the enlarged portion of the bounded volume hierarchy, according to various example embodiments.

FIG. 8 is a block diagram illustrating data stored in the enlarged portion of the bounded volume hierarchy 400, according to various example embodiments. As mentioned above, any given node may store multiple values for the attribute. For example, a single node (e.g., node 432, acting as parent node or child node) may store multiple color values for a single pixel or for a single voxel by storing a separate color palette value (e.g., color index number or other color identifier) or a separate set (e.g., trio) of color space values (e.g., tristimulus values such as red-green-blue values) for each camera among a group of cameras. As shown in FIG. 8, the representative value 532 may be one of multiple representative values, and the multiple representative values may be stored in vector form. Accordingly, the node 432 may store a representative vector 832 of ordered values (e.g., ordered representative values), and the representative value 532 may be a single ordered value among these ordered values in the representative vector 832.

Similarly, the offset 541 may be an offset value (e.g., first offset value) that is one of multiple offset values (e.g., first offset values), and the multiple offset values may be stored in vector form. Thus, the node 441 (e.g., first child node) may store an offset vector 841 (e.g., a first offset vector) of ordered values (e.g., ordered first offset values), and the offset 541 may be a single ordered value among these ordered values in the offset vector 841. Other child nodes (e.g., node 442) of the parent node (e.g., node 432) may be similarly configured.

Likewise, the representative offset 749 may be a representative offset value that is one of multiple representative offset values, and the multiple representative offset values may be stored in vector form. Thus, the representative child node 449 may store a representative offset vector 849 of ordered values (e.g., ordered representative offset values), and the representative offset 749 may be a single representative offset value among these ordered values in the representative offset vector 849.

According to various example embodiments, multiple vectors of ordered values for the attribute are fully or partially defined for any given node. For example, multiple motion vectors may be stored, indicated, or otherwise specified for a single node (e.g., a different set of ordered motion values, in two dimensions or three dimensions, for each camera among a group of multiple cameras). As another example, multiple surface normal vectors may be stored for a single node (e.g., a different set of ordered surface normal values, in two dimensions or three dimensions, for each camera among the group of multiple cameras). In situations where each of multiple vectors for a node corresponds to a different camera, the corresponding camera may be identified by a camera identifier (e.g., a camera number, camera name, or camera location in two or three dimensions), and the camera identifier may be stored in or with the corresponding vector.

Figure 9:
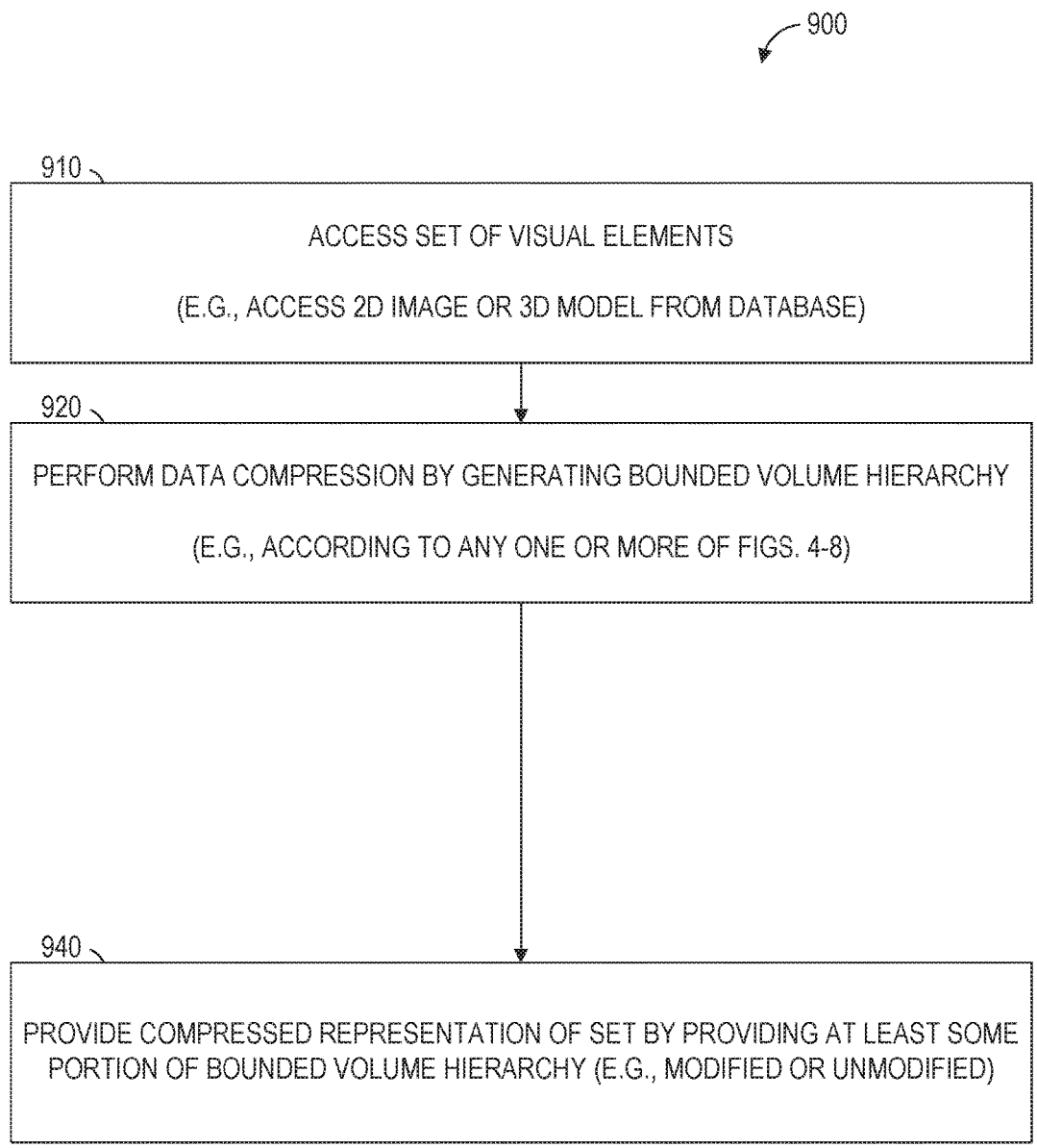
FIGS. 9-12 are flowcharts illustrating operations in a method of data compression for visual elements, according to some example embodiments.

FIGS. 9-12 are flowcharts illustrating operations (e.g., by the data compression machine 110) in performing a method 900 of data compression for visual elements, according to some example embodiments. Operations in the method 900 may be performed by the data compression machine 110, the device 130, or distributed among them, using components (e.g., modules) described above with respect to FIG. 2, using one or more processors (e.g., microprocessors or other hardware processors), or using any suitable combination thereof. As shown in FIG. 9, the method 900 includes operations 910, 920, and 940.

In operation 910, the database interface 210 accesses a set of visual elements on which data compression is to be performed. The set of visual elements may be or include a two-dimensional image of pixels (e.g., a two-dimensional arrangement of pixels that collectively form an image), a three-dimensional hologram or model composed of voxels (e.g., a three-dimensional arrangement of voxels that collectively form a hologram or other volumetric model). The set of visual elements may be accessed from the database 115, the device 130, the device 150, local storage, local memory, a network source, or any suitable combination thereof.

In operation 920, the data compressor 220 performs data compression on the set of visual elements accessed in operation 910. This data compression is performed by generating the bounded volume hierarchy 400 (e.g., as discussed above with respect to FIGS. 4-8). In particular, the bounded volume hierarchy 400 is generated in a manner such that a parent node (e.g., node 432) has at least a first child node (e.g., node 441) and a second child node (e.g., node 442). In some example embodiments, the parent node also has a representative child node (e.g., representative child node 449).

According to some example embodiments, the bounded volume hierarchy 400 is generated with a quadtree data structure (e.g., to represent two-dimensional visual elements, such as pixels from an image), and each parent node (e.g., node 432) has four child nodes (e.g., exactly four child nodes, such as nodes 441-444), though an additional representative child node (e.g., representative child node 449) may also be present for that parent node (e.g., when representative child nodes are implemented in the bounded volume hierarchy 400). According to certain example embodiments, the bounded volume hierarchy 400 is generated with an octree data structure (e.g., to represent three-dimensional visual elements, such as voxels from a hologram or other three-dimensional model), and each parent node (e.g., node 432) has eight child nodes (e.g., exactly eight child nodes, such as nodes 441-444, among other child nodes), though an additional representative child node (e.g., representative child node 449) may also be present for that parent node (e.g., when representative child nodes are implemented in the bounded volume hierarchy 400).

In operation 940, the device interface 240 provides (e.g., via the network 190) a data-compressed representation of the set of visual elements that was accessed in operation 910. This provision of the data-compressed representation may be performed by providing at least a portion of the bounded volume hierarchy 400 that was generated in operation 920.

Performance of the method 900 results in generating and providing the bounded volume hierarchy 400 (e.g., as discussed above with respect to FIGS. 4-8). This may provide the technical benefit of generating and communicating a data-compressed representation of the set of visual elements accessed in operation 910, such that the data-compressed representation can be efficiently data decompressed, fully or partially, to obtain readily renderable and displayable information. Such efficiencies may provide the further technical benefit of enhanced scalability and speed, thus enabling compression, decompression, rendering, and display of more complex sets of visual elements (e.g., images or holograms) within a given span of time. Accordingly, the method 900 may provide or otherwise facilitate enhancements in performance, visual quality, visual detail, scene complexity, or object complexity in virtual reality applications, augmented reality applications, enhanced reality applications, or other graphics-intensive applications.

Figure 10:
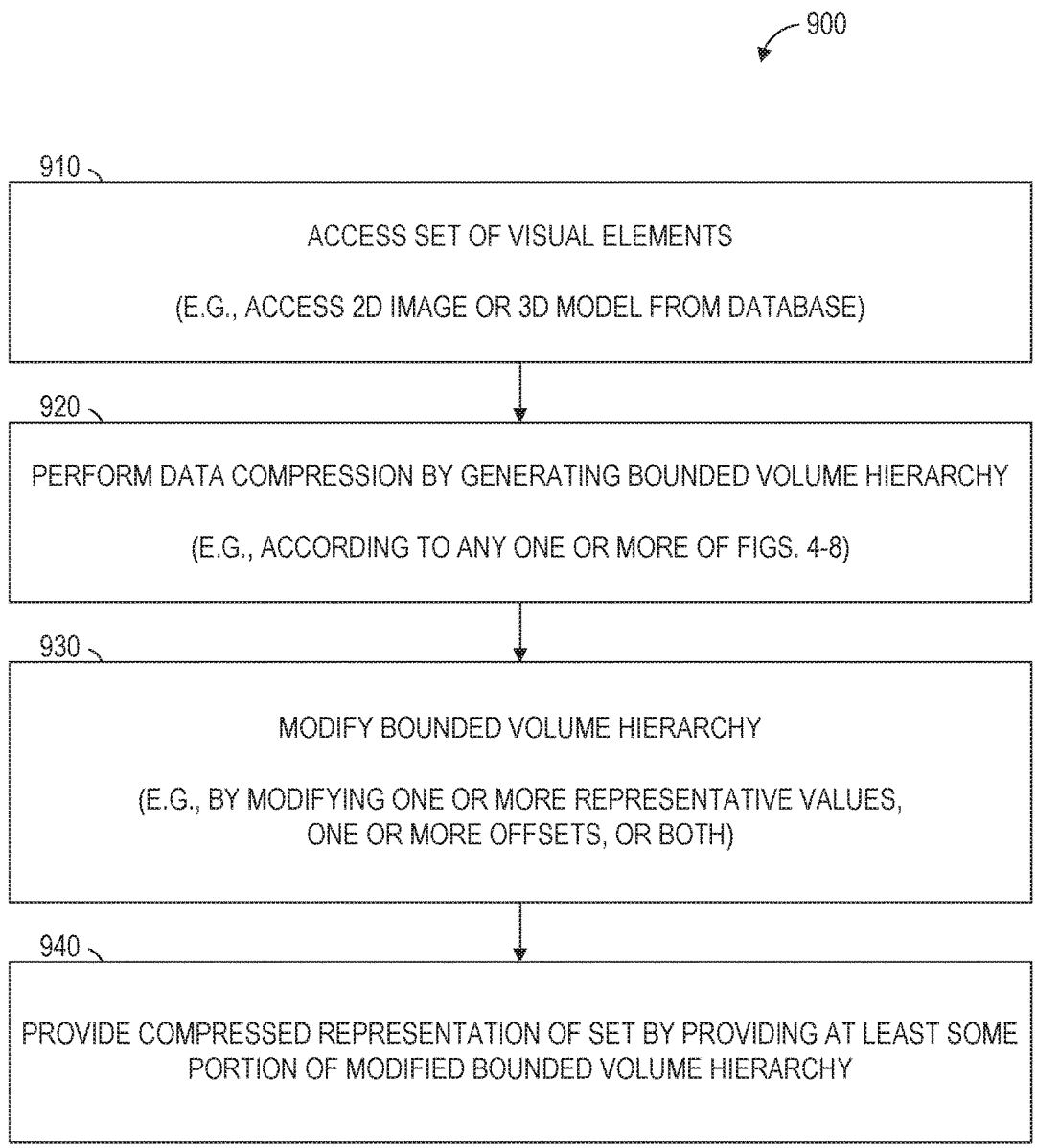

As shown in FIG. 10, some example embodiments of the method 900 includes operations 910, 920, 930, and 940. In such example embodiments, operations 910 and 920 are performed as described above with respect to FIG. 9. However, in operation 930, the data postprocessor 230 modifies the bounded volume hierarchy 400 that was generated in operation 920. This modification of the bounded volume hierarchy 400 may be performed (e.g., as a post-processing operation) by modifying a representative value (e.g., representative value 532) that is stored by a parent node (e.g., node 432), modifying an offset (e.g., offset 541, which may be a first offset) that is stored by a child node of the parent node (e.g., node 441, which may be a first child node), or both.

According to certain example embodiments, the modification of the representative value (e.g., representative value 532) is based on itself. For example, although the representative value was initially generated (e.g., calculated) based on the offsets collectively indicated by its child nodes, here in operation 930, the representative value (e.g., representative value 532) may be modified without influence from those offsets (e.g., without recalculating the representative value in view of any modifications to those offsets).

In addition, according to various example embodiments, the modification of the offset (e.g., offset 541 or first offset) is based on itself. For example, although the offset continues to fully or partially define a deviation from the representative value (e.g., representative value 532), here in operation 930, the offset may be modified without influence from the representative value (e.g., without recalculating the offset in view of any modification to the representative value).

In example embodiments that contain operation 930, performance of operation 940 may include provision of the generated bounded volume hierarchy 400, as modified by performance of operation 930. That is, the providing of the data-compressed representation of the set of visual elements may include providing at least a portion of the modified bounded volume hierarchy 400.

Figure 11:
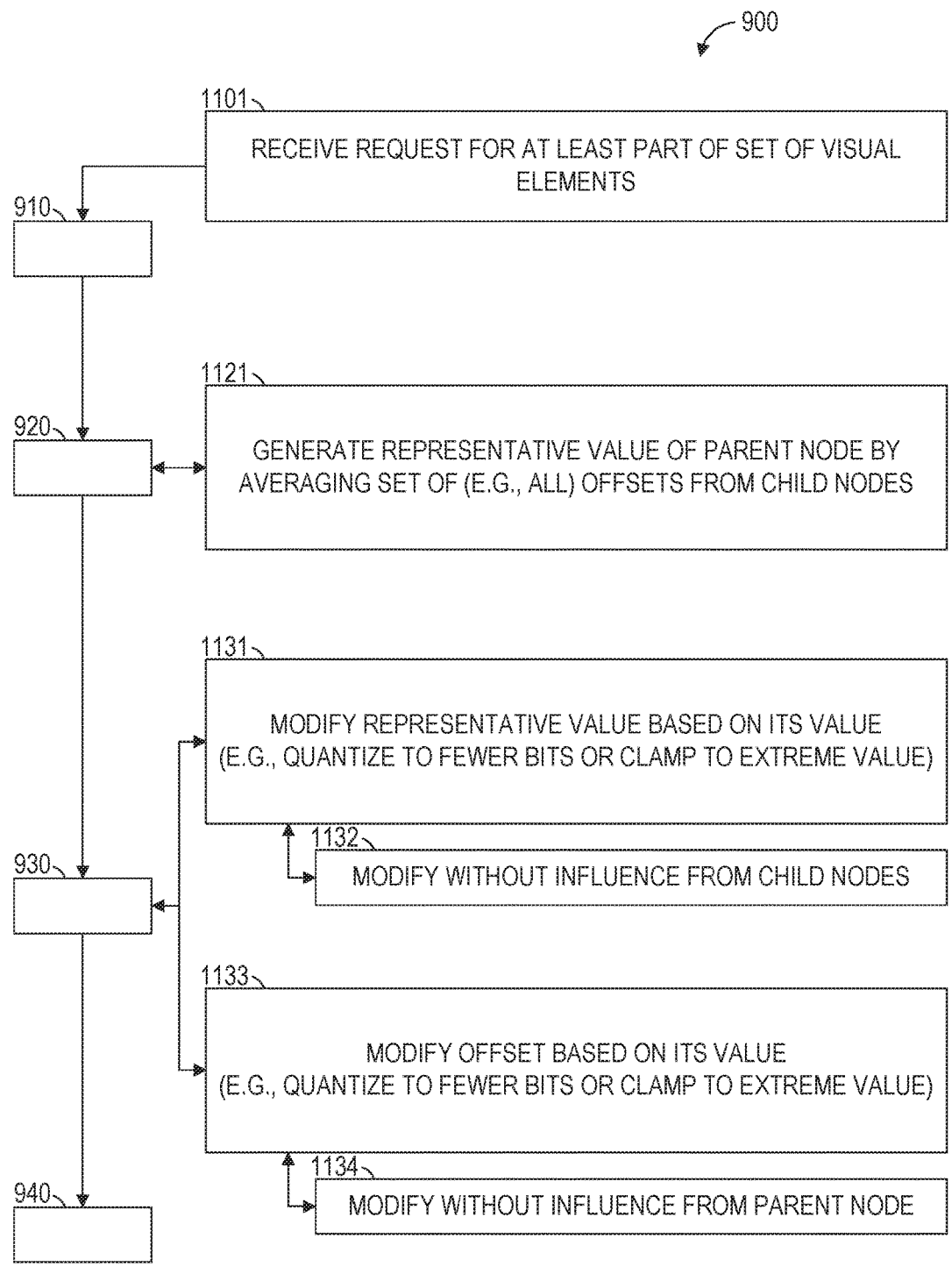

As shown in FIG. 11, in addition to any one or more of the operations previously described, the method 900 may include one or more of operations 1101, 1121, 1131, 1132, 1133, and 1134. Operation 1101 may be performed prior to operation 910. In operation 1101, the device interface 240 receives a request for provision of the set of visual elements (e.g., in compressed or uncompressed form). The request may be received from the device 130 (e.g., via the network 190), and in such example embodiments, performance of operation 940 may include providing the compressed representation of the set of visual elements to the device 130 from which the request is received. That is, operation 940 may be performed in response to the request received in operation 1101.

Operation 1121 may be performed as part (e.g., a precursor task, a subroutine, or a portion) of operation 920, in which the data compressor 220 generates the bounded volume hierarchy 400. In operation 1121, the data compressor 220 generates the representative value 532 to be stored in the node 432 (e.g., acting as a parent node). The representative value 532 may be generated by averaging a set of offsets (e.g., offsets 541 and 542) stored by at least two child nodes (e.g., nodes 441 and 442). In some example embodiments, all of the offsets stored by all of the child nodes (e.g., nodes 441-444) are averaged to generate the representative value 532. According to certain example embodiments, a median is calculated instead of an average, or a weighted average is calculated (e.g., by applying different mathematical weights to different ranges of values for the offsets).

One or both of operations 1131 and 1133 may be performed as part of operation 930, in which the data compressor 220 modifies the generated bounded volume hierarchy 400. In operation 1131, the data compressor 220 modifies a representative value (e.g., representative value 532) stored in a parent node (e.g., node 432, acting as a parent node). For example, the representative value may be quantized, thresholded (e.g., clamped to a threshold value for the attribute, which may be an extreme value, such as a minimum value for the attribute or a maximum value for the attribute), or both.

As shown in FIG. 11, operation 1132 may be performed as part of operation 1131. In accordance with operation 1132, the modification of the representative value (e.g., representative value 532) in operation 1131 is performed based on the representative value itself. That is, the representative value may be quantized, thresholded, or both, based on its own (e.g., initial) value (e.g., as generated), and such quantization or thresholding may be performed without influence from the offsets of the child nodes of the parent node (e.g., without recalculating the representative value in view of any modifications to the offsets indicated by the child nodes).

In operation 1133, the data compressor 220 modifies an offset (e.g., offset 541, which may be a first offset or first offset value) stored in a child node (e.g., node 441) of the parent node (e.g., node 432) discussed above with respect to operation 1131. For example, the offset (e.g., offset value) may be quantized, thresholded (e.g., clamped to a threshold value for the attribute, which may be an extreme value, such as a minimum value for the attribute or a maximum value for the attribute), or both.

As shown in FIG. 11, operation 1134 may be performed as part of operation 1133. In accordance with operation 1134, the modification of the offset (e.g., offset 541, which may be a first offset or first offset value) in operation 1133 is performed based on the offset itself. That is, the offset (e.g., offset value) may be a quantized, threshold, or both, based on its own (e.g., initial) value (e.g., as generated), and such quantization or thresholding may be performed without influence from the representative value of the parent node (e.g., without recalculating the offset in view of any modifications to the representative value indicated by the parent node).

Figure 12:
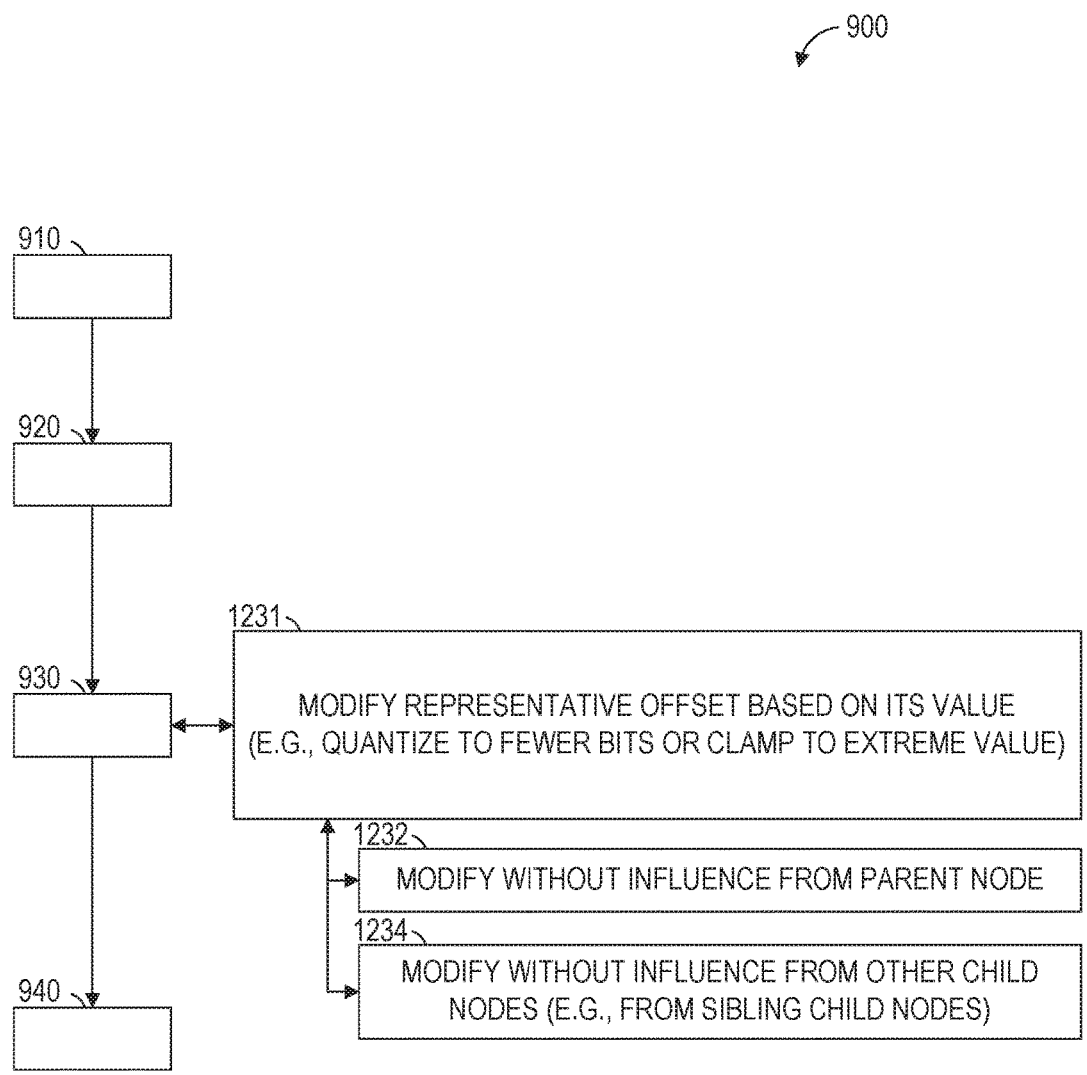

As shown in FIG. 12, in addition to any one or more of the operations previously described, the method 900 may include one or more of operations 1231, 1232, and 1234. Operation 1231 may be performed as part of operation 930, in which the data compressor 220 modifies the generated bounded volume hierarchy 400.

In operation 1231, the data compressor 220 modifies a representative offset (e.g., representative offset 749) stored in a representative child node (e.g., representative child node 449). For example, the representative offset (e.g., representative offset value) may be quantized, thresholded (e.g., clamped to a threshold value for the attribute, which may be an extreme value, such as a minimum value for the attribute or a maximum value for the attribute), or both.

As shown in FIG. 12, one or more of operations 1232 and 1234 may be performed as part of operation 1231. In accordance with one or both of operations 1232 and 1234, the modification of the representative offset (e.g., representative offset 749) in operation 1231 is performed based on the representative offset itself. That is, the representative offset (e.g., representative offset value) may be quantized, thresholded, or both, based on its own (e.g., initial) value (e.g., as generated). Thus, according to operation 1232, such quantization or thresholding is performed without influence from the representative value (e.g., representative value 532) of the parent node (e.g., without recalculating the representative offset in view of any modifications to the representative value indicated by the parent node). Furthermore, according to operation 1234, quantization or thresholding is performed without influence from the offsets of the child nodes of the parent node (e.g., without recalculating the representative offset in view of any modifications to the offsets indicated by the sibling child nodes of the representative child node 449).

Figure 13:
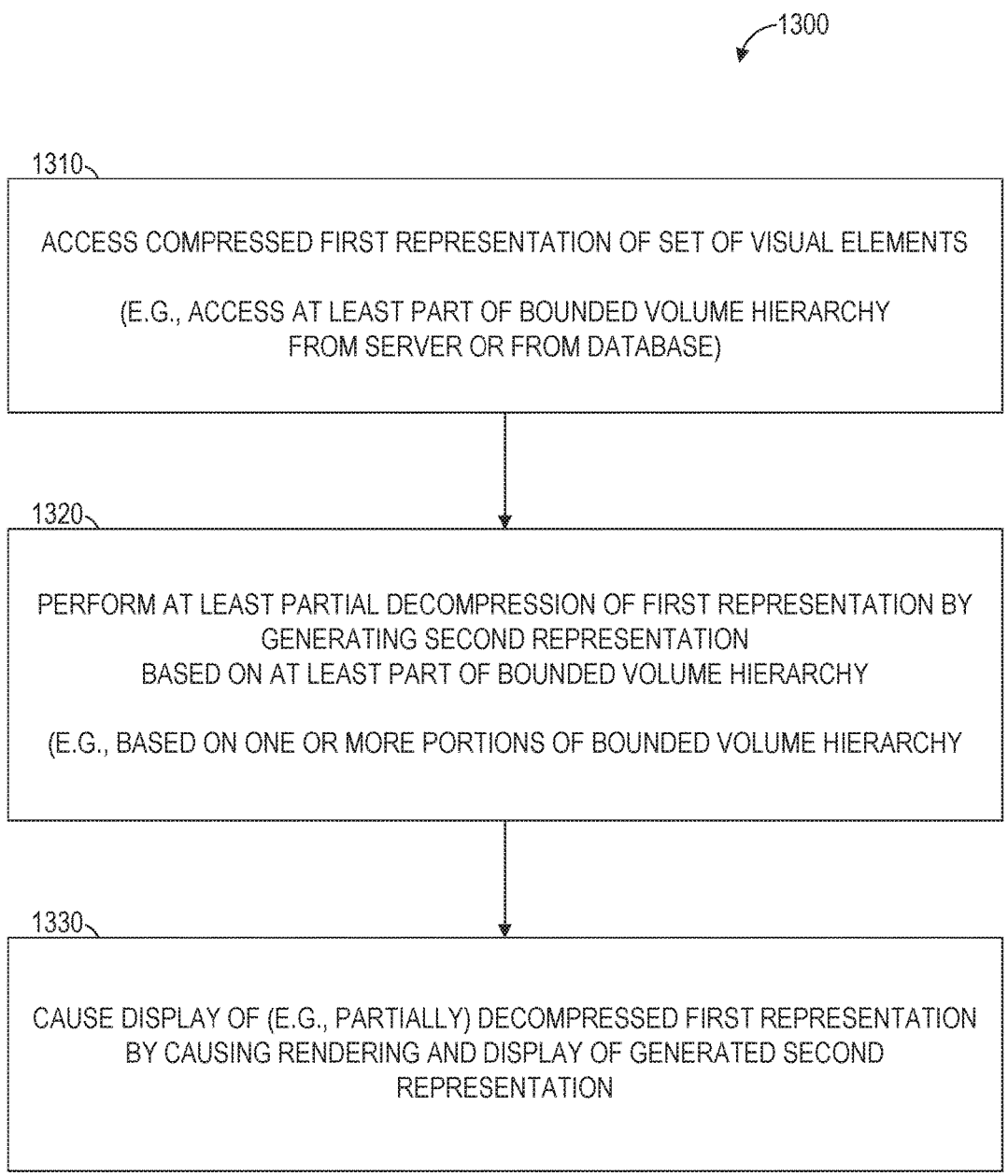
FIGS. 13-15 are flowcharts illustrating operations in a method of data decompression, according to some example embodiments.
Figure 14:
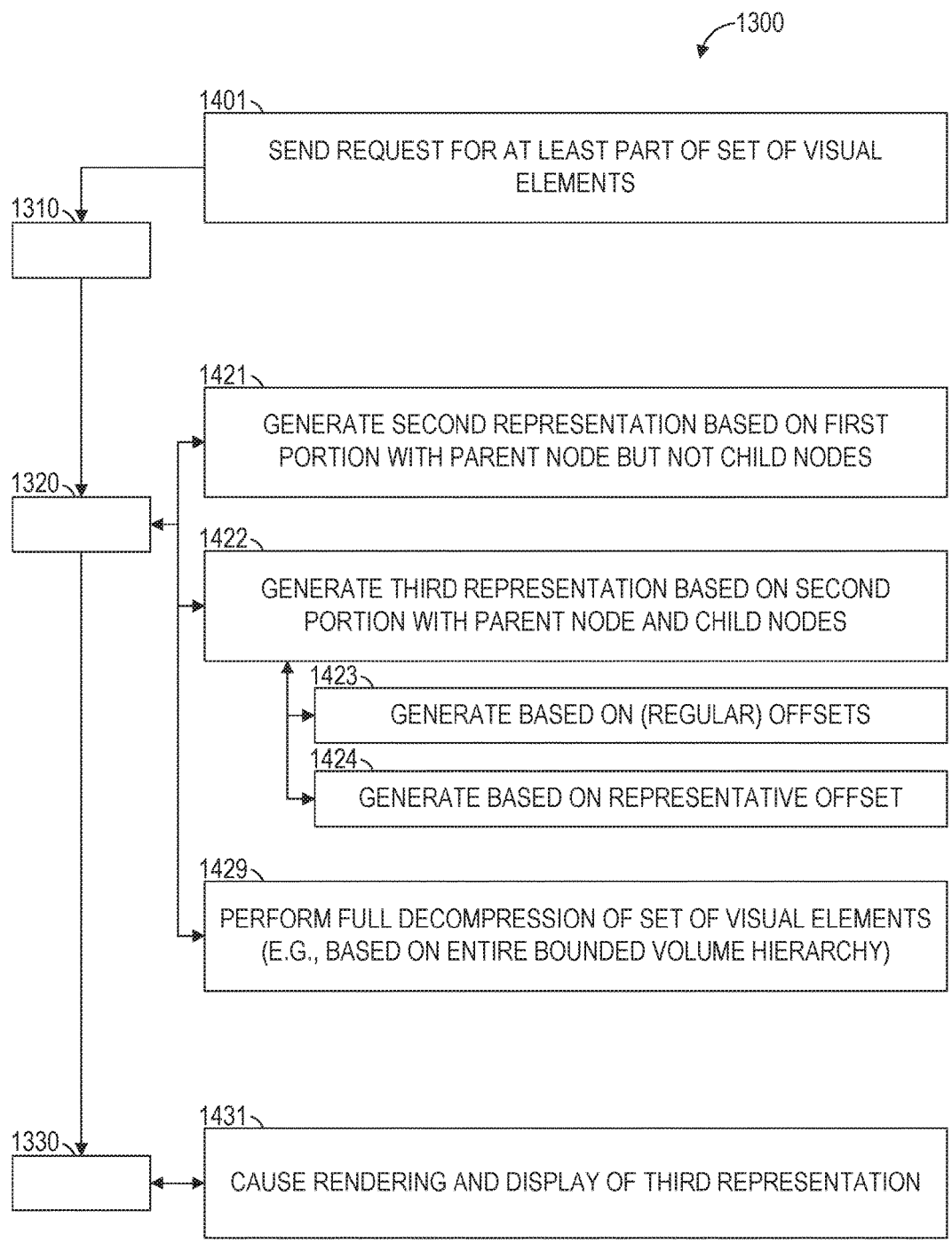
Figure 15:
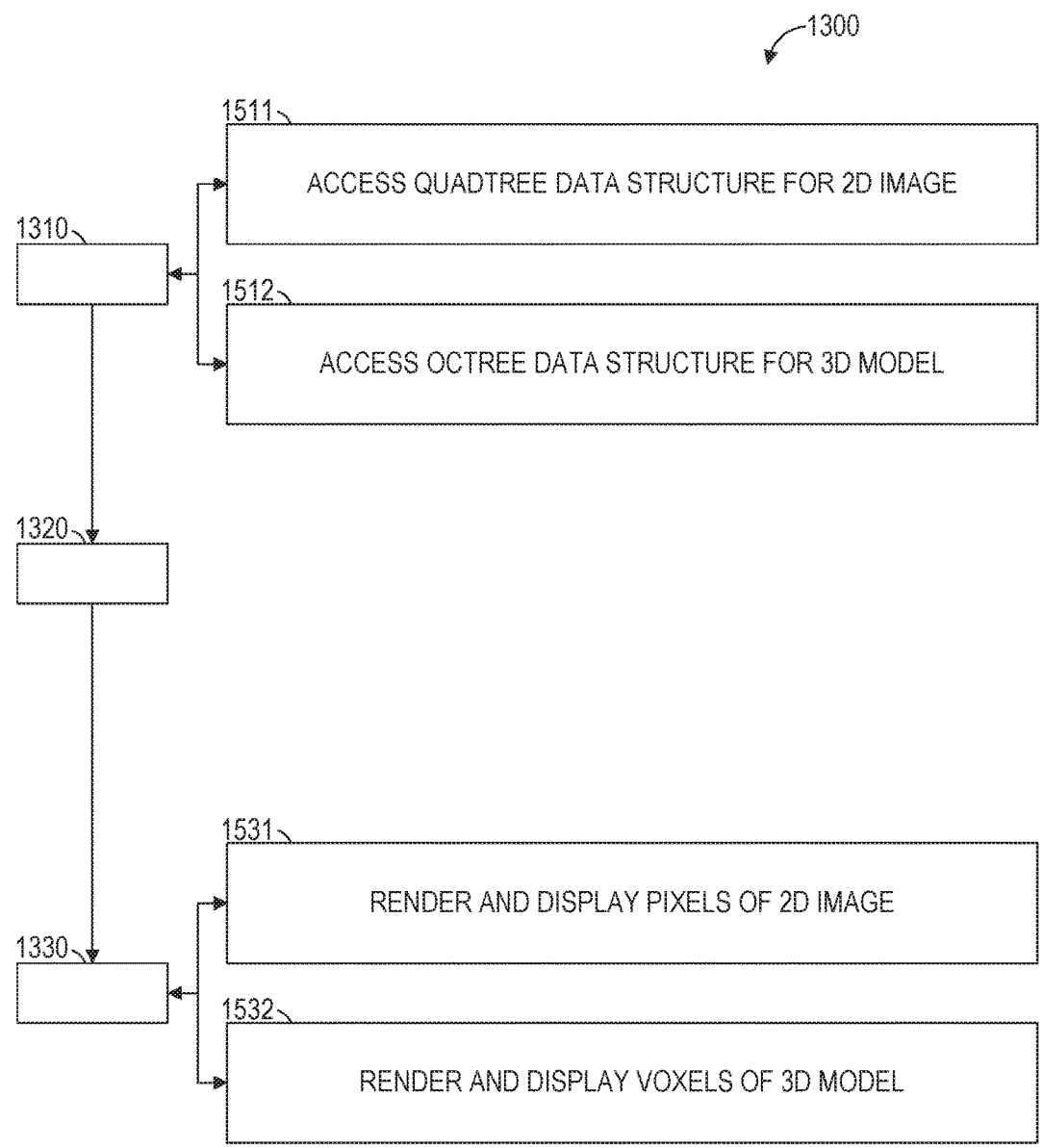

FIGS. 13-15 are flowcharts illustrating operations (e.g., by the device 130) in performing a method 1300 of data decompression, according to some example embodiments. Operations in the method 1300 may be performed by the device 130, the data compression machine 110, or distributed among them, using components (e.g., modules) described above with respect to FIG. 3, using one or more processors (e.g., microprocessors or other hardware processors), or using any suitable combination thereof. As shown in FIG. 13, the method 1300 includes operations 1310, 1320, and 1330.

In operation 1310, the server interface 310 accesses a data-compressed representation of a set of visual elements, and this accessed representation may be referred to as a first representation of the set. As noted above, the set of visual elements may be or include a two-dimensional image of pixels (e.g., a two-dimensional arrangement of pixels that collectively form an image), a three-dimensional hologram or model composed of voxels (e.g., a three-dimensional arrangement of voxels that collectively form a hologram or other volumetric model). The data-compressed first representation of the set may be accessed from the database 115, the data compression machine 110, the device 150, local storage, local memory, a network source, or any suitable combination thereof. In particular, the data-compressed version of the set is or includes the output of operation 940 in the method 900. That is, the accessed first representation of the set of visual elements is or includes at least a portion of the bounded volume hierarchy 400 (e.g., as generated in operation 920, as possibly modified in operation 930, and as provided in operation 940).

In operation 1320, the data decompressor 320 performs partial data decompression on the first representation accessed in operation 1310 (e.g., first representation of the set of visual elements). This data decompression is performed by generating a second representation of the set of visual elements (e.g., as a partially decompressed version of the first representation), and this second representation is generated based on (e.g., only) a portion of the bounded volume hierarchy 400 (e.g., as generated in operation 920, as possibly modified in operation 930, and as provided in operation 940). As mentioned above, the bounded volume hierarchy 400 has a parent node (e.g., node 432), and that parent node has at least a first child node (e.g., node 441) and a second child node (e.g., node 442). In some example embodiments, the parent node also has a representative child node (e.g., representative child node 449).

In operation 1330, the data renderer 330 causes display of the partially data decompressed first representation of the set of visual elements. This may be performed by causing rendering and display of the generated second representation of the set. For example, the data renderer 330 may cause local graphics hardware (e.g., a graphics processing unit (GPU)) to render the generated second representation and then cause display hardware (e.g., a display screen) to display the output of this rendering operation.

Performance of the method 1300 results in partially decompressing the bounded volume hierarchy 400 (e.g., as discussed above with respect to FIGS. 4-8) and rendering and displaying the resulting output (e.g., second representation of the set of visual elements). This may provide the technical benefit of efficiently data decompressing just a portion of the bounded volume hierarchy 400, to obtain readily renderable and displayable information. Such efficiencies may provide the further technical benefit of enhanced scalability and speed, thus enabling decompression, rendering, and display of more complex sets of visual elements (e.g., images or holograms) within a given span of time. Accordingly, the method 1300 may provide or otherwise facilitate enhancements in performance, visual quality, visual detail, scene complexity, or object complexity in virtual reality applications, augmented reality applications, enhanced reality applications, or other graphics-intensive applications.

As shown in FIG. 14, in addition to any one or more of the operations previously described for the method 1300, the method 1300 may include one or more of operations 1401, 1421, 1422, 1423, 1424, 1429, and 1431. Operation 1401 may be performed prior to operation 1310. In operation 1401, the user interface 340 generates and sends a request for provision of the set of visual elements (e.g., in compressed or uncompressed form). The request may be communicated to the data compression machine 110 (e.g., via the network 190), and in such example embodiments, performance of operation 1310 may include accessing (e.g., receiving) the compressed first representation of the set of visual elements from the data compression machine 110 to which the request was sent. That is, operation 1310 may be performed in response to the sending of the request in operation 1401.

One or more of operations 1421, 1422, and 1429 may be performed as part (e.g., a precursor task, a subroutine, or a portion) of operation 1320, in which the data decompressor 320 generates the second representation of the set of visual elements. As noted above, in generating the second representation of the set, only a portion (e.g., subset) of the bounded volume hierarchy 400 is used. In particular, according to operation 1421, the data decompressor 320 omits at least the first and second child nodes (e.g., nodes 441 and 442) from the portion used to generate the second representation. Up to all of the child nodes (e.g., nodes 441-444) of a parent node (e.g., node 432) can be omitted from the portion used to generate the second representation. Furthermore, in situations where the parent node also has a representative child node (e.g., representative child node 449), the representative child node may also be omitted from the portion used in operation 1320.

In operation 1422, the method 1300 may proceed to perform additional partial decompression of the bounded volume hierarchy 400 by decompressing the previously omitted child nodes (e.g., nodes 441 and 442, which may respectively be first and second child nodes) of the parent node (e.g., node 432). This may be performed by generating a third representation of the set of visual elements. The third representation may be generated based on a further portion (e.g., second portion) of the bounded volume hierarchy 400, in which further portion the previously omitted child nodes (e.g., nodes 441 and 442) are included and no longer omitted. In some example embodiments, the parent node (e.g., node 432) is also included in this further portion of the bounded volume hierarchy 400.

One or both of operations 1423 and 1424 may be performed as part of operation 1422. In some example embodiments, the bounded volume hierarchy 400 is implemented without representative child nodes (e.g., hero child nodes, such as nodes 419, 429, 439, 449, and 459). In such example embodiments, and in accordance with operation 1423, the third representation is generated based on offsets (e.g., regular offsets, such as offsets 541 and 542) stored in child nodes (e.g., nodes 441 and 442) of the parent node (e.g., node 432). In alternative example embodiments, the bounded volume hierarchy 400 includes representative child nodes (e.g., nodes 419, 429, 439, 449, and 459). In such example embodiments, and in accordance with operation 1424, the representation is generated based on both regular offsets (e.g., offsets 541 and 542) and representative offsets (e.g., representative offsets 749) stored in representative child nodes (e.g., representative child node 449).

In operation 1429, the data decompressor 320 performs full decompression on the entirety of the first representation of the set of visual elements (e.g., as accessed in operation 1310). This may be performed by reconstructing (e.g., with or without data loss) the set of visual elements based on the accessed bounded volume hierarchy 400 in its entirety. Accordingly, performance of operation 1429 may include performance of operation 1422.

In example embodiments that include one or both of operations 1422 and 1429, operation 1431 may be performed as part of operation 1330, in which the data renderer 330 causes rendering and display of the second representation of the set of visual elements (e.g., as generated in operation 1320). In operation 1431, the data renderer 330 causes rendering and display of the third representation of the set of visual elements (e.g., as generated in operation 1422). For example, the data renderer 330 may cause local graphics hardware (e.g., GPU) to render the generated third representation and then cause display hardware (e.g., display screen) to display the output of this rendering operation.

As shown in FIG. 15, in addition to any one or more of the operations previously described for the method 1300, the method 1300 may include one or more of operations 1511, 1512, 1531, and 1532. One or both of operations 1511 and 1512 may be performed as part of operation 1310, in which the server interface 310 accesses the first representation of the set of visual elements.

In accordance with operation 1511, the accessing of the first representation in operation 1310 includes accessing at least a portion of the bounded volume hierarchy 400 in the form of a quadtree data structure (e.g., encoding or otherwise representing two-dimensional visual elements, such as pixels of an image). Thus, at least a portion of the quadtree data structure is accessed in operation 1511.

In accordance with operation 1512, the accessing of the first representation in operation 1310 includes accessing at least a portion of the bounded volume hierarchy 400 in the form of an octree data structure (e.g., encoding or otherwise representing three-dimensional visual elements, such as voxels of a hologram or other three-dimensional model). Thus, at least a portion of the octree data structure is accessed in operation 1512.

One or both of operations 1531 and 1532 may be performed as part of operation 1330, in which the data renderer 330 renders and displays the second representation of the set of visual elements (e.g., as generated in operation 1320). In example embodiments that include operation 1511, the data renderer 330 performs operation 1531 by rendering and displaying two-dimensional visual elements (e.g., pixels of an image), with or without data loss. For example, the two-dimensional visual elements may be rendered on local graphics hardware (e.g., GPU) and then displayed by display hardware (e.g., display screen). In example embodiments that include operation 1512, the data renderer 330 performs operation 1532 by rendering and displaying three-dimensional visual elements (e.g., voxels of a hologram or other three-dimensional model), with or without data loss. For example, the three-dimensional visual elements may be rendered on local graphics hardware (e.g., GPU) and then displayed by display hardware (e.g., display screen).

According to various example embodiments, one or more of the methodologies described herein may facilitate data compression, data decompression, or both, with respect to sets of visual elements. Moreover, one or more of the methodologies described herein may facilitate generating and providing a compressed representation of the set of visual elements, such that the data-compressed representation can be efficiently decompressed, fully or partially. Furthermore, one or more of the methodologies described herein may facilitate efficient full or partial decompression of a compressed representation of the set of visual elements. Hence, one or more of the methodologies described herein may facilitate enhanced scalability and speed in compressing, decompressing, rendering, or displaying of complex sets of visual elements, as well as enhancements in performance, visual quality, visual detail, scene complexity, or object complexity in augmented reality applications or other graphics intensive applications, compared to capabilities of pre-existing systems and methods.

When these effects are considered in aggregate, one or more of the methodologies described herein may obviate a need for certain efforts or resources that otherwise would be involved in such efficient data compression and data decompression. Efforts expended by a user in performing such data compression or such data decompression, or usage of information resulting therefrom, may be reduced by use of (e.g., reliance upon) a special-purpose machine that implements one or more of the methodologies described herein. Computing resources used by one or more systems or machines (e.g., within the network environment 100) may similarly be reduced (e.g., compared to systems or machines that lack the structures discussed herein or are otherwise unable to perform the functions discussed herein). Examples of such computing resources include processor cycles, network traffic, computational capacity, main memory usage, graphics rendering capacity, graphics memory usage, data storage capacity, power consumption, and cooling capacity.

Figure 16:
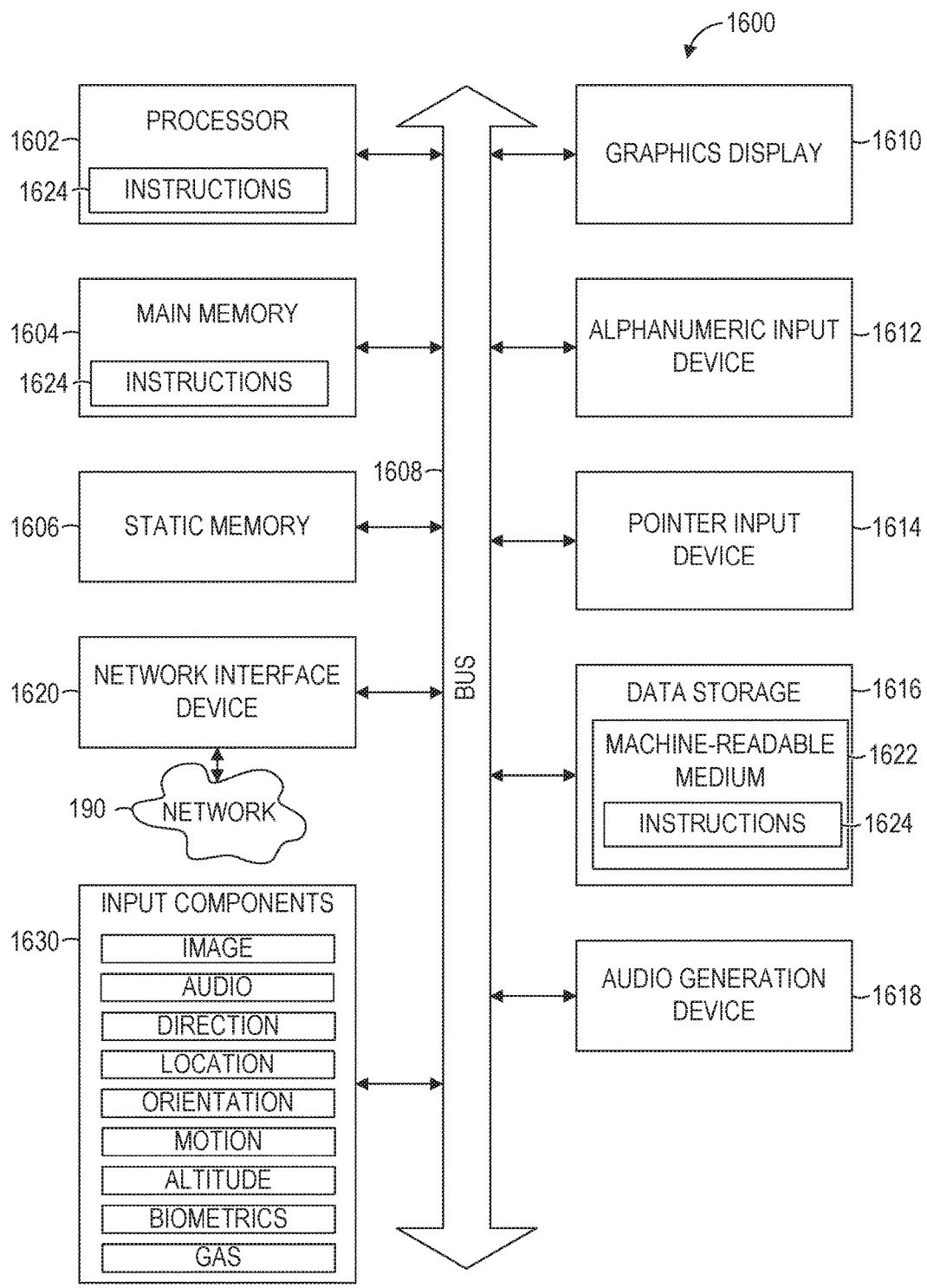
FIG. 16 is a block diagram illustrating components of a machine (e.g., the data compression machine, the device, or both), according to some example embodiments, able to read instructions from a machine-readable medium and perform any one or more of the methodologies discussed herein.

FIG. 16 is a block diagram illustrating components of a machine 1600, according to some example embodiments, able to read instructions 1624 from a machine-readable medium 1622 (e.g., a non-transitory machine-readable medium, a machine-readable storage medium, a computer-readable storage medium, or any suitable combination thereof) and perform any one or more of the methodologies discussed herein, in whole or in part. Specifically, FIG. 16 shows the machine 1600 in the example form of a computer system (e.g., a computer) within which the instructions 1624 (e.g., software, a program, an application, an applet, an app, or other executable code) for causing the machine 1600 to perform any one or more of the methodologies discussed herein may be executed, in whole or in part.

In alternative embodiments, the machine 1600 operates as a standalone device or may be communicatively coupled (e.g., networked) to other machines. In a networked deployment, the machine 1600 may operate in the capacity of a server machine or a client machine in a server-client network environment, or as a peer machine in a distributed (e.g., peer-to-peer) network environment. The machine 1600 may be a server computer, a client computer, a personal computer (PC), a tablet computer, a laptop computer, a netbook, a cellular telephone, a smart phone, a set-top box (STB), a personal digital assistant (PDA), a web appliance, a network router, a network switch, a network bridge, or any machine capable of executing the instructions 1624, sequentially or otherwise, that specify actions to be taken by that machine. Further, while only a single machine is illustrated, the term "machine" shall also be taken to include any collection of machines that individually or jointly execute the instructions 1624 to perform all or part of any one or more of the methodologies discussed herein.

The machine 1600 includes a processor 1602 (e.g., one or more central processing units (CPUs), one or more graphics processing units (GPUs), one or more digital signal processors (DSPs), one or more application specific integrated circuits (ASICs), one or more radio-frequency integrated circuits (RFICs), or any suitable combination thereof), a main memory 1604, and a static memory 1606, which are configured to communicate with each other via a bus 1608. The processor 1602 contains solid-state digital microcircuits (e.g., electronic, optical or both) that are configurable, temporarily or permanently, by some or all of the instructions 1624 such that the processor 1602 is configurable to perform any one or more of the methodologies described herein, in whole or in part. For example, a set of one or more microcircuits of the processor 1602 may be configurable to execute one or more modules (e.g., software modules) described herein. In some example embodiments, the processor 1602 is a multicore CPU (e.g., a dual-core CPU, a quad-core CPU, an 8-core CPU, or a 128-core CPU) within which each of multiple cores behaves as a separate processor that is able to perform any one or more of the methodologies discussed herein, in whole or in part. Although the beneficial effects described herein may be provided by the machine 1600 with at least the processor 1602, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 1600 may further include a graphics display 1610 (e.g., a plasma display panel (PDP), a light emitting diode (LED) display, a liquid crystal display (LCD), a projector, a cathode ray tube (CRT), or any other display capable of displaying graphics or video). The machine 1600 may also include an alphanumeric input device 1612 (e.g., a keyboard or keypad), a pointer input device 1614 (e.g., a mouse, a touchpad, a touchscreen, a trackball, a joystick, a stylus, a motion sensor, an eye tracking device, a data glove, or other pointing instrument), a data storage 1616, an audio generation device 1618 (e.g., a sound card, an amplifier, a speaker, a headphone jack, or any suitable combination thereof), and a network interface device 1620.

The data storage 1616 (e.g., a data storage device) includes the machine-readable medium 1622 (e.g., a tangible and non-transitory machine-readable storage medium) on which are stored the instructions 1624 embodying any one or more of the methodologies or functions described herein. The instructions 1624 may also reside, completely or at least partially, within the main memory 1604, within the static memory 1606, within the processor 1602 (e.g., within the processor's cache memory), or any suitable combination thereof, before or during execution thereof by the machine 1600. Accordingly, the main memory 1604, the static memory 1606, and the processor 1602 may be considered machine-readable media (e.g., tangible and non-transitory machine-readable media). The instructions 1624 may be transmitted or received over the network 190 via the network interface device 1620. For example, the network interface device 1620 may communicate the instructions 1624 using any one or more transfer protocols (e.g., hypertext transfer protocol (HTTP)).

In some example embodiments, the machine 1600 may be a portable computing device (e.g., a smart phone, a tablet computer, or a wearable device), and may have one or more additional input components 1630 (e.g., sensors or gauges). Examples of such input components 1630 include an image input component (e.g., one or more cameras), an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), a biometric input component (e.g., a heartrate detector or a blood pressure detector), and a gas detection component (e.g., a gas sensor). Input data gathered by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1622 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1624 for execution by the machine 1600, such that the instructions 1624, when executed by one or more processors of the machine 1600 (e.g., processor 1602), cause the machine 1600 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof. A "non-transitory" machine-readable medium, as used herein, specifically does not include propagating signals per se. In some example embodiments, the instructions 1624 for execution by the machine 1600 may be communicated by a carrier medium. Examples of such a carrier medium include a storage medium (e.g., a non-transitory machine-readable storage medium, such as a solid-state memory, being physically moved from one place to another place) and a transient medium (e.g., a propagating signal that communicates the instructions 1624).

Certain example embodiments are described herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein. "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an application program interface (API)). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical magnetic, or optical signals capable of being stored, accessed, transferred, combined, compared, or otherwise manipulated by a machine. It is convenient at times, principally for reasons of common usage, to refer to such signals using words such as "data." "content," "bits," "values," "elements," "symbols," "characters," "terms." "numbers," "numerals." or the like. These words, however, are merely convenient labels and are to be associated with appropriate physical quantities.

Unless specifically stated otherwise, discussions herein using words such as "accessing," "processing." "detecting," "computing." "calculating." "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated embodiments describe various example embodiments of methods, machine-readable media, and systems (e.g., machines, devices, or other apparatus) discussed herein.

Some example embodiments perform server-side compression, among other things, and the generated bounded volume hierarchy may include one or more parent nodes without representative child nodes. Accordingly, a first embodiment provides a method comprising:

accessing, by one or more processors of a machine, a set of visual elements in which each visual element has a different relative location within an arrangement of the visual elements and specifies a corresponding value of an attribute whose values vary among the visual elements;

performing, by one or more processors of the machine, data compression on the set of visual elements by generating a bounded volume hierarchy in which a parent node represents a subset of the visual elements, the parent node having first and second child nodes and indicating a representative value of the attribute, the first child node indicating a first offset from the representative value and the second child node indicating a second offset from the representative value of the attribute, the representative value being generated based on the first and second offsets collectively indicated by the first and second child nodes;

modifying, by one or more processors of the machine, the generated bounded volume hierarchy by modifying the representative value based on itself and modifying the first offset based on itself; and providing, by one or more processors of the machine, a data-compressed representation of the set of visual elements by providing at least a portion of the modified bounded volume hierarchy in which the parent node indicates the modified representative value and in which the first child node indicates the modified first offset.

The representative value and the first offset may each be modified independently of each other. Accordingly, a second embodiment provides a method according to the first embodiment, wherein:

the modifying of the representative value is performed without influence from the modified first offset; and the modifying of the first offset is performed without influence from the modified representative value.

The representative value and the first offset may each be quantized to a smaller size in memory (e.g., a same smaller size). Accordingly, a third embodiment provides a method according to the first embodiment or the second embodiment, wherein:

the modifying of the representative value includes quantizing the representative value to occupy a fewer number of bits; and the modifying of the first offset includes quantizing the first offset to occupy the number of bits occupied by the quantized representative value.

The representative value, the first offset, or both, may be clamped based on a threshold. Accordingly, a fourth embodiment provides a method according to any of the first through third embodiments, wherein:

the modifying of the generated bounded volume hierarchy includes at least one of:

setting the representative value to an extreme value based on a comparison of the representative value to a threshold value that indicates a threshold distance from the extreme value, or setting the first offset to the extreme value based on a comparison of the first offset to the threshold value that indicates the threshold distance from the extreme value.

An offset value can be additive in nature. Accordingly, a fifth embodiment provides a method according to any of the first through fourth embodiments, wherein:

the first offset is a positive or negative number that indicates a corresponding absolute deviation in the attribute by the first child node from the parent node.

An offset value can be multiplicative (e.g., proportional) in nature. Accordingly, a sixth embodiment provides a method according to any of the first through fifth embodiments, wherein:

the first offset is a scalar coefficient that indicates a corresponding proportional deviation in the attribute by the first child node from the parent node.

A parent node may store an average value of at least two child nodes. Accordingly, a seventh embodiment provides a method according to any of the first through sixth embodiments, wherein:

the generating of the bounded volume hierarchy includes averaging a set of offsets indicated by a set of child nodes of the parent node, the set of child nodes including the first and second child nodes; and the representative value indicated by the parent node is an average of the set of offsets indicated by the set of child nodes of the parent node.

A parent node may store an average value of all child nodes. Accordingly, an eighth embodiment provides a method according to any of the first through seventh embodiments, wherein:

the generating of the bounded volume hierarchy includes averaging all offsets indicated by all child nodes of the parent node, the child nodes including the first and second child nodes; and the representative value indicated by the parent node is an average of all offsets indicated by all child nodes of the parent node.

Multiple values of an attribute may be specified for each visual element. Accordingly, a ninth embodiment provides a method according to any of the first through eighth embodiments, wherein:

each visual element specifies multiple corresponding values of the attribute within a corresponding vector of ordered values of the attribute:

the parent node indicates a representative vector of ordered representative values of the attribute;

the first child node indicates a first offset vector from the representative vector, the first offset vector including ordered first offset values that each indicate a corresponding deviation from a corresponding one of the ordered representative values;

the second child node indicates a second offset vector from the representative vector, the second offset vector including ordered second offset values that each indicate a corresponding deviation from a corresponding one of the ordered representative values; and the representative vector is generated based on the first and second offset vectors collectively indicated by the first and second child nodes.

For example, such multiple values may correspond to camera identifiers. Accordingly, a tenth embodiment provides a method according to the ninth embodiment, wherein:
the ordered representative values in the representative vector each correspond to a different camera identifier among a plurality of camera identifiers;
the ordered first offset values each correspond to a different camera identifier among the plurality of camera identifiers; and
the ordered second offset values each correspond to a different camera identifier among the plurality of camera identifiers.

As another example, such multiple values may correspond to colors (e.g., red-green-blue trios of color values) captured, recorded, or output by different cameras. Accordingly, an eleventh embodiment provides a method according to the ninth embodiment, wherein:
the ordered representative values in the representative vector include reference trios of color space values, each reference trio corresponding to a different camera identifier among a plurality of camera identifiers;
the ordered first offset values include first trios of color offset values, each of the first trios corresponding to a different camera identifier among the plurality of camera identifiers; and
the ordered second offset values include second trios of color offset values, each of the second trios corresponding to a different camera identifier among the plurality of camera identifiers.

As another example, such multiple values may correspond to palette colors captured, recorded, or output by different cameras. Accordingly, a twelfth embodiment provides a method according to the ninth embodiment, wherein:
the ordered representative values in the representative vector include reference palette index values that each correspond to a different camera identifier among a plurality of camera identifiers;
the ordered first offset values include first palette offset values that each correspond to a different camera identifier among the plurality of camera identifiers; and
the ordered second offset values include second palette offset values that each correspond to a different camera identifier among the plurality of camera identifiers.

As another example, such multiple values may correspond to different surface normals that each may correspond to a different camera. Accordingly, a thirteenth embodiment provides a method according to the ninth embodiment, wherein:
the ordered representative values in the representative vector include reference trios of surface normal values, each reference trio defining a different surface normal vector that corresponds to a different camera among a plurality of cameras;
the ordered first offset values include first trios of surface normal offset values, each of the first trios defining a different offset vector that corresponds to a different camera among the plurality of cameras; and
the ordered second offset values include second trios of surface normal offset values, each of the second trios defining a different offset vector that corresponds to a different camera among the plurality of cameras.

The aforementioned server-side compression may include interactively providing compressed data in response to a request. Accordingly, a fourteenth embodiment provides a method according to any of the first through thirteenth embodiments, further comprising:
receiving a request from a client device for provision of the set of visual elements; and wherein
the providing of the data-compressed representation of the set of visual elements includes providing the generated bounded volume hierarchy from a server machine to the client device in response to the request.

The server-side compression may include compression of color using trios of color space values. Accordingly, a fifteenth embodiment provides a method according to any of the first through ninth embodiments or the eleventh embodiment, wherein:
the attribute is color;
each visual element specifies its corresponding color by specifying a corresponding trio of color space values;
the first offset includes a first trio of color offset values; and
the second offset includes a second trio of color offset values.

The server-side compression may include compression of color using palette index values. Accordingly, a sixteenth embodiment provides a method according to any of the first through ninth embodiments or the twelfth embodiment, wherein:
the attribute is color;
each visual element specifies its corresponding color by specifying a corresponding palette index value;
the first offset includes a first palette offset value; and
the second offset includes a second palette offset value.

The server-side compression may include compression of transparency information. Accordingly, a seventeenth embodiment provides a method according to any of the first through ninth embodiments, wherein:
the attribute is transparency;
each visual element specifies its corresponding transparency by specifying a corresponding alpha value;
the first offset includes a first alpha offset value; and
the second offset includes a second alpha offset value.

The server-side compression may include compression of reflectivity information. Accordingly, an eighteenth embodiment provides a method according to any of the first through ninth embodiments, wherein:
the attribute is reflectivity;
each visual element specifies its corresponding reflectivity by specifying a corresponding reflectance value;
the first offset includes a first reflectance offset value; and
the second offset includes a second reflectance offset value.

In addition, a nineteenth embodiment provides a machine-readable medium (e.g., non-transitory machine-readable storage medium) comprising instructions that, when executed by one or more processors of a machine, cause the machine to perform operations comprising:
accessing a set of visual elements in which each visual element has a different relative location within an arrangement of the visual elements and specifies a corresponding value of an attribute whose values vary among the visual elements;
performing data compression on the set of visual elements by generating a bounded volume hierarchy in which a parent node represents a subset of the visual elements, the parent node having first and second child nodes and indicating a representative value of the attribute, the first child node indicating a first offset from the representative value and the second child node indicating a second offset from the representative value of the attribute, the representative value being generated based on the first and second offsets collectively indicated by the first and second child nodes;

modifying the generated bounded volume hierarchy by modifying the representative value based on itself and modifying the first offset based on itself; and providing a data-compressed representation of the set of visual elements by providing at least a portion of the modified bounded volume hierarchy in which the parent node indicates the modified representative value and in which the first child node indicates the modified first offset.

Furthermore, a twentieth embodiment provides a system (e.g., computer system) comprising:

one or more processors; and a memory storing instructions that, when executed by at least one processor among the one or more processors, cause the system to perform operations comprising:

accessing a set of visual elements in which each visual element has a different relative location within an arrangement of the visual elements and specifies a corresponding value of an attribute whose values vary among the visual elements;

performing data compression on the set of visual elements by generating a bounded volume hierarchy in which a parent node represents a subset of the visual elements, the parent node having first and second child nodes and indicating a representative value of the attribute, the first child node indicating a first offset from the representative value and the second child node indicating a second offset from the representative value of the attribute, the representative value being generated based on the first and second offsets collectively indicated by the first and second child nodes;

modifying the generated bounded volume hierarchy by modifying the representative value based on itself and modifying the first offset based on itself; and providing a data-compressed representation of the set of visual elements by providing at least a portion of the modified bounded volume hierarchy in which the parent node indicates the modified representative value and in which the first child node indicates the modified first offset.

Some example embodiments perform client-side decompression, among other things, and the generated bounded volume hierarchy may include one or more parent nodes without representative child nodes. In certain example embodiments, a parent node is decompressed without decompressing one or more of its children. Accordingly, a twenty-first embodiment provides a method comprising:

accessing, by one or more processors of a machine, a data-compressed first representation of a set of visual elements by accessing a modified bounded volume hierarchy in which a parent node represents a subset of the visual elements, the parent node having first and second child nodes and indicating a representative value of an attribute whose values vary among the visual elements, the first child node indicating a first offset from the representative value and the second child node indicating a second offset from the representative value of the attribute, the representative value being previously generated based on the first and second offsets collectively indicated by the first and second child nodes, the representative value being previously modified based on itself;

performing, by one or more processors of the machine, partial data decompression on the first representation of the set of visual elements by generating a second representation of the set of visual elements based on a portion of the modified bounded volume hierarchy, in which portion the parent node indicates the representative value that was modified based on itself after being generated based on the first and second offsets from the representative value, the portion of the bounded volume hierarchy omitting the first and second child nodes; and causing, by one or more processors of the machine, display of the partially decompressed first representation by causing rendering and display of the second representation generated based on the portion of the bounded volume hierarchy.

The representative value and the first offset may each have been previously quantized to fit a smaller size in memory (e.g., a same smaller size). Accordingly, a twenty-second embodiment provides a method according to the twenty-first embodiment, wherein:

the representative value was previously modified by quantization to occupy a fewer number of bits; and the first offset was previously modified by quantization to occupy the number of bits occupied by the quantized representative value.

The representative value, the first offset, or both, may be clamped based on a threshold. Accordingly, a twenty-third embodiment provides a method according to the twenty-first embodiment or the twenty-second embodiment, wherein:

the accessed modified bounded volume hierarchy was previously modified by at least one of:

the representative value being set to an extreme value based on a pre-modification comparison of the representative value to a threshold value that indicates a threshold distance from the extreme value, or the first offset being set to the extreme value based on a pre-modification comparison of the first offset to the threshold value that indicates the threshold distance from the extreme value.

An offset value can be additive in nature. Accordingly, a twenty-fourth embodiment provides a method according to any of the twenty-first through twenty-third embodiments, wherein:

the first offset is a positive or negative number that indicates a corresponding absolute deviation in the attribute by the first child node from the parent node.

An offset value can be multiplicative (e.g., proportional) in nature. Accordingly, a twenty-fifth embodiment provides a method according to any of the twenty-first through twenty-fourth embodiments, wherein:

the first offset is a scalar coefficient that indicates a corresponding proportional deviation in the attribute by the first child node from the parent node.

The aforementioned client-side decompression may include decompression of one or more child nodes of a parent node, in addition to decompression of that parent node. Accordingly, a twenty-sixth embodiment provides a method according to any of the twenty-first to twenty-fifth embodiments, wherein:

the portion that omits the first and second child nodes is a first portion of the bounded volume hierarchy; and the performing of partial data decompression on the first representation of the set of visual elements includes generating a third representation of the set of visual elements based on a second portion of the bounded volume hierarchy in which second portion the parent node indicates the representative value generated based on the first and second offsets from the representative value, the second portion including the first and second child nodes with the parent node.

The client-side decompression may include or otherwise facilitate rendering and display of decompressed child nodes of a parent node. Accordingly, a twenty-seventh embodiment provides a method according to the twenty-sixth embodiment, wherein:

the causing of the display of the partially decompressed first representation includes causing rendering and display of the third representation of the set of visual elements generated based on the second portion of the bounded volume hierarchy.

The client-side decompression may include or otherwise facilitate full decompression of the data-compressed first representation of the set of visual elements. Accordingly, a twenty-eighth embodiment provides a method according to any of the twenty-first through twenty-seventh embodiments, further comprising:

performing full data decompression on the first representation of the set of visual elements by reconstructing the set of visual elements based on the accessed bounded volume hierarchy in its entirety.

A parent node may store an average value of at least two child nodes. Accordingly, a twenty-ninth embodiment provides a method according to any of the twenty-first through twenty-eighth embodiments, wherein:

the representative value indicated by the parent node is an average of a set of offsets indicated by a set of child nodes of the parent node, the set of child nodes including the first and second child nodes; and the rendering of the second representation of the set of visual elements is based on the average of the set of offsets indicated by the set of child nodes of the parent node.

A parent node may store an average value of all child nodes. Accordingly, a thirtieth embodiment provides a method according to any of the twenty-first through twenty-ninth embodiments, wherein:

the representative value indicated by the parent node is an average of all offsets indicated by all child nodes of the parent node, the child nodes including the first and second child nodes; and the rendering of the second representation of the set of visual elements is based on the average of all offsets indicated by all child nodes of the parent node.

Multiple values of an attribute may be specified for each visual element. Accordingly, a thirty-first embodiment provides a method according to any of the twenty-first through thirtieth embodiments, wherein:

each visual element in the set of visual elements specifies multiple corresponding values of the attribute within a corresponding vector of ordered values of the attribute;

the parent node indicates a representative vector of ordered representative values of the attribute;

the first child node indicates a first offset vector from the representative vector, the first offset vector including ordered first offset values that each indicate a corresponding deviation from a corresponding one of the ordered representative values;

the second child node indicates a second offset vector from the representative vector, the second offset vector including ordered second offset values that each indicate a corresponding deviation from a corresponding one of the ordered representative values; and the representative vector is generated based on the first and second offset vectors collectively indicated by the first and second child nodes.

For example, such multiple values may correspond to camera identifiers that identify different cameras. Accordingly, a thirty-second embodiment provides a method according to the thirty-first embodiment, wherein:

the ordered representative values in the representative vector each correspond to a different camera identifier among a plurality of camera identifiers;

the ordered first offset values each correspond to a different camera identifier among the plurality of camera identifiers; and the ordered second offset values each correspond to a different camera identifier among the plurality of camera identifiers.

As another example, such multiple values may correspond to colors (e.g., red-green-blue trios of color values) captured, recorded, or output by different cameras. Accordingly, a thirty-third embodiment provides a method according to the thirty-first embodiment, wherein:

the ordered representative values in the representative vector include reference trios of color space values, each reference trio corresponding to a different camera identifier among a plurality of camera identifiers;

the ordered first offset values include first trios of color offset values, each of the first trios corresponding to a different camera identifier among the plurality of camera identifiers; and the ordered second offset values include second trios of color offset values, each of the second trios corresponding to a different camera identifier among the plurality of camera identifiers.

As another example, such multiple values may correspond to different surface normals that each may correspond to a different camera. Accordingly, a thirty-fourth embodiment provides a method according to the thirty-first embodiment, wherein:

the ordered representative values in the representative vector include reference trios of surface normal values, each reference trio defining a different surface normal vector that corresponds to a different camera among a plurality of cameras;

the ordered first offset values include first trios of surface normal offset values, each of the first trios defining a different offset vector that corresponds to a different camera among the plurality of cameras; and the ordered second offset values include second trios of surface normal offset values, each of the second trios defining a different offset vector that corresponds to a different camera among the plurality of cameras.

The aforementioned client-side decompression may include interactively requesting and receiving compressed data. Accordingly, a thirty-fifth embodiment provides a method according to any of the twenty-first through thirty-fourth embodiments, further comprising sending a request to a server machine for provision of the set of visual elements; and wherein the accessing of the data-compressed first representation of the set of visual elements includes receiving, at a client device, the modified bounded volume hierarchy from the server machine in response to the request.

The client-side decompression may include decompression of movement information (e.g., motion vectors). Accordingly, a thirty-sixth embodiment provides a method according to any of the twenty-first through thirty-first embodiments, wherein the attribute is movement;

each visual element specifies its corresponding movement by specifying a corresponding motion vector;

the first offset includes a first motion offset vector; and the second offset includes a second motion offset vector.

The client-side decompression may be performed to fully or partially decompress a bounded volume hierarchy in quadtree form to obtain all or part of a two-dimensional image. Accordingly, a thirty-seventh embodiment provides a method according to any of the thirty-first through thirty-sixth embodiments, wherein:

the accessing of the data-compressed first representation of the set of visual elements includes accessing a quadtree data structure that includes the parent node and the first and second child nodes; and in response to the accessing of the quadtree data structure, the rendering of the second representation of the set of visual elements includes a rendering of pixels of a two-dimensional image, each pixel having a different relative location within the two-dimensional image.

The client-side decompression may be performed to fully or partially decompress a bounded volume hierarchy in octree form to obtain all or part of a three-dimensional hologram or other three-dimensional volumetric model. Accordingly, a thirty-eighth embodiment provides a method according to any of the thirty-first through thirty-sixth embodiments, wherein:

the accessing of the data-compressed first representation of the set of visual elements includes accessing an octree data structure that includes the parent node and the first and second child nodes; and in response to the accessing of the octree data structure, the rendering of the second representation of the set of visual elements includes a rendering of voxels of a three-dimensional volume, each voxel having a different relative location within the three-dimensional volume.

In addition, the thirty-ninth embodiment provides a machine-readable medium (e.g., a non-transitory machine-readable storage medium) comprising instructions that, when executed by one or more processors of a machine, cause the machine to perform operations comprising:

accessing a data-compressed first representation of a set of visual elements by accessing a modified bounded volume hierarchy in which a parent node represents a subset of the visual elements, the parent node having first and second child nodes and indicating a representative value of an attribute whose values vary among the visual elements, the first child node indicating a first offset from the representative value and the second child node indicating a second offset from the representative value of the attribute, the representative value being previously generated based on the first and second offsets collectively indicated by the first and second child nodes, the representative value being previously modified based on itself;

performing partial data decompression on the first representation of the set of visual elements by generating a second representation of the set of visual elements based on a portion of the modified bounded volume hierarchy, in which portion the parent node indicates the representative value that was modified based on itself after being generated based on the first and second offsets from the representative value, the portion of the bounded volume hierarchy omitting the first and second child nodes; and causing display of the partially decompressed first representation by causing rendering and display of the second representation generated based on the portion of the bounded volume hierarchy.

Furthermore, a fortieth embodiment provides a system (e.g., a computer system) comprising:

one or more processors; and a memory storing instructions that, when executed by at least one processor among the one or more processors, cause the system to perform operations comprising:

accessing a data-compressed first representation of a set of visual elements by accessing a modified bounded volume hierarchy in which a parent node represents a subset of the visual elements, the parent node having first and second child nodes and indicating a representative value of an attribute whose values vary among the visual elements, the first child node indicating a first offset from the representative value and the second child node indicating a second offset from the representative value of the attribute, the representative value being previously generated based on the first and second offsets collectively indicated by the first and second child nodes, the representative value being previously modified based on itself;

performing partial data decompression on the first representation of the set of visual elements by generating a second representation of the set of visual elements based on a portion of the modified bounded volume hierarchy, in which portion the parent node indicates the representative value that was modified based on itself after being generated based on the first and second offsets from the representative value, the portion of the bounded volume hierarchy omitting the first and second child nodes; and causing display of the partially decompressed first representation by causing rendering and display of the second representation generated based on the portion of the bounded volume hierarchy.

Some example embodiments perform server-side compression, among other things, and the generated bounded volume hierarchy may include one or more parent nodes with a representative child node. Accordingly, a forty-first embodiment provides a method comprising:

accessing, by one or more processors of a machine, a set of visual elements in which each visual element has a different relative location within an arrangement of the visual elements and specifies a corresponding value of an attribute whose values vary among the visual elements;

performing, by one or more processors of the machine, data compression on the set of visual elements by generating a bounded volume hierarchy in which a parent node represents a subset of the visual elements, the parent node having first and second child nodes and indicating a representative value of the attribute, the parent node having a representative child node that indicates a representative offset from the representative value, the first child node indicating a first offset from the representative offset and the second child node indicating a second offset from the representative offset, the representative value being generated based on the first, second, and representative offsets collectively indicated by the first, second, and representative child nodes; and providing, by one or more processors of the machine, a data-compressed representation of the set of visual elements by providing at least a portion of the bounded volume hierarchy in which the parent node indicates the representative value and in which the first child node indicates the first offset.

As noted above, the generated bounded volume hierarchy may be modified after generation. Accordingly, a forty-second embodiment provides a method according to the forty-first embodiment, further comprising:

modifying the generated bounded volume hierarchy by modifying the representative value based on itself and modifying the first offset based on itself; and wherein the providing of at least a portion of the bounded volume hierarchy includes providing at least a portion of the modified bounded volume hierarchy in which the parent node indicates the modified representative value and in which the first child node indicates the modified first offset.

The representative value and the first offset may each be modified independently of each other. Accordingly, a forty-third embodiment provides a method according to the forty-second embodiment, wherein:
the modifying of the representative value is performed without influence from the modified first offset; and
the modifying of the first offset is performed without influence from the modified representative value.

The representative value and the first offset may each be quantized to a smaller size in memory (e.g., a same smaller size). Accordingly, a forty-fourth embodiment provides a method according to the forty-second embodiment or the forty-third embodiment, wherein:
the modifying of the representative value includes quantizing the representative value to occupy a fewer number of bits; and
the modifying of the first offset includes quantizing the first offset to occupy the number of bits occupied by the quantized representative value.

The representative value, the first offset, or both, may be clamped based on a threshold. Accordingly, a forty-fifth embodiment provides a method according to any of the forty-second through forty-fourth embodiments, wherein:
the modifying of the generated bounded volume hierarchy includes at least one of:
setting the representative value to an extreme value based on a comparison of the representative value to a threshold value that indicates a threshold distance from the extreme value, or
setting the first offset to the extreme value based on a comparison of the first offset to the threshold value that indicates the threshold distance from the extreme value.

The representative offset may be similarly modified, for example, as part of modifying the generated bounded volume hierarchy. Accordingly, a forty-sixth embodiment provides a method according to any of the forty-second through forty-fifth embodiments, wherein:
the modifying of the generated bounded volume hierarchy includes modifying the representative offset based on itself; and
the providing of at least a portion of the bounded volume hierarchy includes providing at least a portion of the modified bounded volume hierarchy in which the representative child node indicates the modified representative offset from the modified representative value.

For example, the reference offset may be quantized to a smaller size in memory (e.g., the same smaller size used for quantizing the representative value on the first offset), clamped based on a threshold, or both. Accordingly, a forty-seventh embodiment provides a method according to the forty-sixth embodiment, wherein:
the modifying of the representative offset includes at least one of:
quantizing the representative offset, or
setting the representative offset to an extreme value based on a comparison of the representative offset to a threshold value that indicates a threshold distance from the extreme value.

A representative offset can be additive in nature. Accordingly, a forty-eighth embodiment provides a method according to any of the forty-first through forty-seventh embodiments, wherein:
the representative offset is a positive or negative number that indicates a representative absolute deviation in the attribute from the parent node, the representative absolute deviation representing collective absolute deviations by all child nodes of the parent node except the representative child node.

A representative offset can be multiplicative (e.g., proportional) in nature. Accordingly, a forty-ninth embodiment provides a method according to any of the forty-first through forty-seventh embodiments, wherein:
the representative offset is a scalar coefficient that indicates a corresponding representative proportional deviation in the attribute from the parent node, the representative proportional deviation representing collective proportional deviations by all child nodes of the parent node except the representative child node.

Multiple values of an attribute may be specified for each visual element. Accordingly, a fiftieth embodiment provides a method according to any of the forty-first through forty-ninth embodiments, wherein:
each visual element specifies multiple corresponding values of the attribute within a corresponding vector of ordered values of the attribute;
the parent node indicates a representative vector of ordered representative values of the attribute;
the representative child node indicates a representative offset vector from the representative vector indicated by the parent node, the representative offset vector including ordered representative offset values that each indicate a corresponding primary deviation from a corresponding one of the ordered representative values in the representative vector;
the first child node indicates a first offset vector from the representative offset vector, the first offset vector including ordered first offset values that each indicate a corresponding secondary deviation from a corresponding one of the primary deviations indicated in the representative offset vector;
the second child node indicates a second offset vector from the representative offset vector, the second offset vector including ordered second offset values that each indicate a corresponding secondary deviation from a corresponding one of the primary deviations indicated in the representative offset vector; and
the representative vector is generated based on the first, second, and representative offset vectors collectively indicated by the first, second, and representative child nodes.

For example, such multiple values may correspond to colors (e.g., red-green-blue trios of color values) captured, recorded, or output by different cameras. Accordingly, a fifty-first embodiment provides a method according to the fiftieth embodiment, wherein:
the ordered representative values in the representative vector include reference trios of color space values, each reference trio corresponding to a different camera identifier among a plurality of camera identifiers;
the ordered representative offset values include representative trios of color offset values, each of the representative trios corresponding to a different camera identifier among the plurality of camera identifiers;
the ordered first offset values include first trios of color offset values, each of the first trios corresponding to a different camera identifier among the plurality of camera identifiers; and
the ordered second offset values include second trios of color offset values, each of the second trios corresponding to a different camera identifier among the plurality of camera identifiers.

As another example, such multiple values may correspond to palette colors captured, recorded, or output by different cameras. Accordingly, a fifty-second embodiment provides a method according to the fiftieth embodiment, wherein:
the ordered representative values in the representative vector include reference palette index values that each correspond to a different camera identifier among a plurality of camera identifiers;

the ordered representative offset values include representative palette offset values that each correspond to a different camera identifier among the plurality of camera identifiers;
the ordered first offset values include first palette offset values that each correspond to a different camera identifier among the plurality of camera identifiers; and
the ordered second offset values include second palette offset values that each correspond to a different camera identifier among the plurality of camera identifiers.

As another example, such multiple values may correspond to different surface normals that each may correspond to a different camera. Accordingly, a fifty-third embodiment provides a method according to the fiftieth embodiment, wherein:
the ordered representative values in the representative vector include reference trios of surface normal values, each reference trio defining a different surface normal vector that corresponds to a different camera among a plurality of cameras;
the ordered representative offset values include representative trios of surface normal offset values, each of the representative trios defining a different offset vector that corresponds to a different camera among the plurality of cameras;
the ordered first offset values include first trios of surface normal offset values, each of the first trios defining a different offset vector that corresponds to a different camera among the plurality of cameras; and
the ordered second offset values include second trios of surface normal offset values, each of the second trios defining a different offset vector that corresponds to a different camera among the plurality of cameras.

The aforementioned server-side compression may include interactively providing compressed data in response to a request. Accordingly, a fifty-fourth embodiment provides a method according to any of the forty-first through fifty-third embodiments, further comprising:
receiving a request from a client device for provision of the set of visual elements; and wherein
the providing of the data-compressed representation of the set of visual elements includes providing the generated bounded volume hierarchy from a server machine to the client device in response to the request.

The server-side compression may include compression of color using trios of color space values. Accordingly, a fifty-fifth embodiment provides a method according to any of the forty-first through fifty-first embodiments, wherein:
the attribute is color;
each visual element specifies its corresponding color by specifying a corresponding trio of color space values;
the representative offset includes a representative trio of color offset values;
the first offset includes a first trio of color offset values; and
the second offset includes a second trio of color offset values.

The server-side compression may include compression of color using palette index values. Accordingly, a fifty-sixth embodiment provides a method according to any of the forty-first through fiftieth embodiments or the fifty-second embodiment, wherein:
the attribute is color;
each visual element specifies its corresponding color by specifying a corresponding palette index value;
the representative offset includes a representative palette offset value;
the first offset includes a first palette offset value; and
the second offset includes a second palette offset value.

The server-side compression may include compression of transparency information. Accordingly, a fifty-seventh embodiment provides a method according to any of the forty-first through fiftieth embodiments, wherein:
the attribute is transparency;
each visual element specifies its corresponding transparency by specifying a corresponding alpha value;
the representative offset includes a representative alpha offset value:
the first offset includes a first alpha offset value; and
the second offset includes a second alpha offset value.

The server-side compression may include compression of reflectivity information. Accordingly, a fifty-eighth embodiment provides a method according to any of the forty-first through fiftieth embodiments, wherein:
the attribute is reflectivity;
each visual element specifies its corresponding reflectivity by specifying a corresponding reflectance value;
the representative offset includes a representative reflectance offset value;
the first offset includes a first reflectance offset value; and
the second offset includes a second reflectance offset value.

In addition, a fifty-ninth embodiment provides a machine-readable medium (e.g., a non-transitory machine-readable storage medium) comprising instructions that, when executed by one or more processors of a machine, cause the machine to perform operations comprising:
accessing a set of visual elements in which each visual element has a different relative location within an arrangement of the visual elements and specifies a corresponding value of an attribute whose values vary among the visual elements;
performing data compression on the set of visual elements by generating a bounded volume hierarchy in which a parent node represents a subset of the visual elements, the parent node having first and second child nodes and indicating a representative value of the attribute, the parent node having a representative child node that indicates a representative offset from the representative value, the first child node indicating a first offset from the representative offset and the second child node indicating a second offset from the representative offset, the representative value being generated based on the first, second, and representative offsets collectively indicated by the first, second, and representative child nodes; and
providing a data-compressed representation of the set of visual elements by providing at least a portion of the bounded volume hierarchy in which the parent node indicates the representative value and in which the first child node indicates the first offset.

Furthermore, a sixtieth embodiment provides a system (e.g., a computer system) comprising:
one or more processors; and
a memory storing instructions that, when executed by at least one processor among the one or more processors, cause the system to perform operations comprising:
accessing a set of visual elements in which each visual element has a different relative location within an arrangement of the visual elements and specifies a corresponding value of an attribute whose values vary among the visual elements:
performing data compression on the set of visual elements by generating a bounded volume hierarchy in which a parent node represents a subset of the visual elements, the parent node having first and second child nodes and indicating a representative value of the attribute, the parent node having a representative child node that indicates a representative offset from the representative value, the first child node indicating a first offset from the representative offset and the second child node indicating a second offset from the representative offset, the representative value being generated based on the first, second, and representative offsets collectively indicated by the first, second, and representative child nodes; and providing a data-compressed representation of the set of visual elements by providing at least a portion of the bounded volume hierarchy in which the parent node indicates the representative value and in which the first child node indicates the first offset.

Some example embodiments perform client-side decompression, among other things, and the generated bounded volume hierarchy may include one or more parent nodes with a representative child node. In certain example embodiments, a parent node is decompressed without decompressing one or more of its children. Accordingly, a sixty-first embodiment provides a method comprising:

accessing, by one or more processors of a machine, a data-compressed first representation of a set of visual elements by accessing a bounded volume hierarchy in which a parent node represents a subset of the visual elements, the parent node having first and second child nodes and indicating a representative value of an attribute whose values vary among the visual elements, the parent node having a representative child node that indicates a representative offset from the representative value, the first child node indicating a first offset from the representative offset and the second child node indicating a second offset from the representative offset, the representative value being previously generated based on the first, second, and representative offsets collectively indicated by the first, second, and representative child nodes;

performing, by one or more processors of the machine, partial data decompression on the first representation of the set of visual elements by generating a second representation of the set of visual elements based on a portion of the accessed bounded volume hierarchy, in which portion the parent node indicates the representative value that was generated based on the first, second, and representative offsets, the portion of the bounded volume hierarchy omitting the first and second child nodes; and causing, by one or more processors of the machine, display of the partially decompressed first representation by causing rendering and display of the second representation generated based on the portion of the bounded volume hierarchy.

The representative offset may have been previously modified, for example, as part of modifying the bounded volume hierarchy after generation. Accordingly, a sixty-second embodiment provides a method according to the sixty-first embodiment, wherein:

the representative child node in the bounded volume hierarchy indicates a modified representative offset that was previously modified based on itself; and the accessing of the bounded volume hierarchy includes accessing a modified bounded volume hierarchy in which the representative child node indicates the modified representative offset from the representative value.

For example, the reference offset may have been previously quantized to a smaller size in memory (e.g., the same smaller size used for quantizing the representative value on the first offset), clamped based on a threshold, or both. Accordingly, a sixty-third embodiment provides a method according to the sixty-first embodiment or the sixty-second embodiment, wherein:

the modified representative offset was previously modified by at least one of:

quantizing a pre-modification representative offset, or setting the pre-modification representative offset to an extreme value based on a comparison of the pre-modification representative offset to a threshold value that indicates a threshold distance from the extreme value.

A representative offset value can be additive in nature. Accordingly, a sixty-fourth embodiment provides a method according to any of the sixty-first through sixty-third embodiments, wherein:

the representative offset is a positive or negative number that indicates a representative absolute deviation in the attribute from the parent node, the representative absolute deviation representing collective absolute deviations by all child nodes of the parent node except the representative child node.

A representative offset value can be multiplicative (e.g., proportional) in nature. Accordingly, a sixty-fifth embodiment provides a method according to any of the sixty-first through sixty-third embodiments, wherein:

the representative offset is a scalar coefficient that indicates a corresponding representative proportional deviation in the attribute from the parent node, the representative proportional deviation representing collective proportional deviations by all child nodes of the parent node except the representative child node.

The representative value and the first offset may each have been previously quantized to fit a smaller size in memory (e.g., a same smaller size), for example, as part of modifying the bounded volume hierarchy after generation. Accordingly, a sixty-sixth embodiment provides a method according to any of the sixty-first through sixty-fifth embodiments, wherein:

the representative value was previously modified by quantization to occupy a fewer number of bits; and the first offset was previously modified by quantization to occupy the number of bits occupied by the quantized representative value.

The representative value, the first offset, or both, may have been previously clamped based on a threshold, for example, as part of modifying the bounded volume hierarchy after generation. Accordingly, a sixty-seventh embodiment provides a method according to any of the sixty-first through sixty-sixth embodiments, wherein:

the accessed bounded volume hierarchy was previously modified by at least one of:

the representative value being set to an extreme value based on a pre-modification comparison of the representative value to a threshold value that indicates a threshold distance from the extreme value, or the first offset being set to the extreme value based on a pre-modification comparison of the first offset to the threshold value that indicates the threshold distance from the extreme value.

The aforementioned client-side decompression may include decompression of one or more child nodes of a parent node, in addition to decompression of that parent node. Accordingly, a sixty-eighth embodiment provides a method according to any of the sixty-first through sixty-seventh embodiments, wherein:

the portion that omits the first and second child nodes is a first portion of the bounded volume hierarchy; and the performing of partial data decompression on the first representation of the set of visual elements includes generating a third representation of the set of visual elements based on a second portion of the bounded volume hierarchy in which second portion the parent node indicates the representative value generated based on the first and second offsets from the representative value, the second portion including the first and second child nodes with the parent node.

The client-side decompression may include or otherwise facilitate rendering and display of decompressed child nodes of a parent node. Accordingly, a sixty-ninth embodiment provides a method according to any of the sixty-first through sixty-eighth embodiments, wherein:

the causing of the display of the partially decompressed first representation includes causing rendering and display of the third representation of the set of visual elements generated based on the second portion of the bounded volume hierarchy.

The client-side decompression may include or otherwise facilitate full decompression of the data-compressed first representation of the set of visual elements. Accordingly, a seventeenth embodiment provides a method according to any of the sixty-first through sixty-ninth embodiments, further comprising:

performing full data decompression on the first representation of the set of visual elements by reconstructing the set of visual elements based on the accessed bounded volume hierarchy in its entirety.

Multiple values of an attribute may be specified for each visual element. Accordingly, a seventy-first embodiment provides a method according to any of the sixty-first through seventieth embodiments, wherein:

each visual element in the set of visual elements specifies multiple corresponding values of the attribute within a corresponding vector of ordered values of the attribute;
the parent node indicates a representative vector of ordered representative values of the attribute;
the representative child node indicates a representative offset vector from the representative vector indicated by the parent node, the representative offset vector including ordered representative offset values that each indicate a corresponding primary deviation from a corresponding one of the ordered representative values in the representative vector;
the first child node indicates a first offset vector from the representative offset vector, the first offset vector including ordered first offset values that each indicate a corresponding secondary deviation from a corresponding one of the primary deviations indicated in the representative offset vector;
the second child node indicates a second offset vector from the representative offset vector, the second offset vector including ordered second offset values that each indicate a corresponding secondary deviation from a corresponding one of the primary deviations indicated in the representative offset vector; and
the representative vector is generated based on the first, second, and representative offset vectors collectively indicated by the first, second, and representative child nodes.

For example, such multiple values may correspond to camera identifiers that identify different cameras. Accordingly, a seventy-second embodiment provides a method according to the seventy-first embodiment, wherein:

the ordered representative values in the representative vector each correspond to a different camera identifier among a plurality of camera identifiers;
the ordered representative offset values each correspond to a different camera identifier among the plurality of camera identifiers;
the ordered first offset values each correspond to a different camera identifier among the plurality of camera identifiers; and
the ordered second offset values each correspond to a different camera identifier among the plurality of camera identifiers.

As another example, such multiple values may correspond to colors (e.g., red-green-blue trios of color values) captured, recorded, or output by different cameras. Accordingly, a seventy-third embodiment provides a method according to the seventy-first embodiment, wherein:

the ordered representative values in the representative vector include reference trios of color space values, each reference trio corresponding to a different camera identifier among a plurality of camera identifiers;
the ordered representative offset values include representative trios of color offset values, each of the representative trios corresponding to a different camera identifier among the plurality of camera identifiers;
the ordered first offset values include first trios of color offset values, each of the first trios corresponding to a different camera identifier among the plurality of camera identifiers; and
the ordered second offset values include second trios of color offset values, each of the second trios corresponding to a different camera identifier among the plurality of camera identifiers.

As another example, such multiple values may correspond to different surface normals that each may correspond to a different camera. Accordingly, a seventy-fourth embodiment provides a method according to the seventy-first embodiment, wherein:

the ordered representative values in the representative vector include reference trios of surface normal values, each reference trio defining a different surface normal vector that corresponds to a different camera among a plurality of cameras;
the ordered representative offset values include representative trios of surface normal offset values, each of the representative trios defining a different offset vector that corresponds to a different camera among the plurality of cameras;
the ordered first offset values include first trios of surface normal offset values, each of the first trios defining a different offset vector that corresponds to a different camera among the plurality of cameras; and
the ordered second offset values include second trios of surface normal offset values, each of the second trios defining a different offset vector that corresponds to a different camera among the plurality of cameras.

The aforementioned client-side decompression may include interactively requesting and receiving compressed data. Accordingly, a seventy-fifth embodiment provides a method according to any of the sixty-first through seventy-fourth embodiments, further comprising:

sending a request to a server machine for provision of the set of visual elements; and wherein
the accessing of the data-compressed first representation of the set of visual elements includes receiving, at a client device, the bounded volume hierarchy from the server machine in response to the request.

The client-side decompression may include decompression of movement information (e.g., motion vectors). Accordingly, a seventy-sixth embodiment provides a method according to any of the sixty-first through seventy-first embodiments, wherein:

the attribute is movement:
each visual element specifies its corresponding movement by specifying a corresponding motion vector;

the representative offset includes a representative motion offset vector;
the first offset includes a first motion offset vector; and
the second offset includes a second motion offset vector.

The client-side decompression may be performed to fully or partially decompress a bounded volume hierarchy in quadtree form to obtain all or part of a two-dimensional image. Accordingly, a seventy-seventh embodiment provides a method according to any of the sixty-first through seventy-sixth embodiments, wherein:
the accessing of the data-compressed first representation of the set of visual elements includes accessing a quadtree data structure that includes the parent node and the first and second child nodes; and
in response to the accessing of the quadtree data structure, the caused rendering of the second representation of the set of visual elements includes a caused rendering of pixels of a two-dimensional image, each pixel having a different relative location within the two-dimensional image.

The client-side decompression may be performed to fully or partially decompress a bounded volume hierarchy in octree form to obtain all or part of a three-dimensional hologram or other three-dimensional volumetric model. Accordingly, a seventy-eighth embodiment provides a method according to any of the sixty-first through seventy-sixth embodiments, wherein:
the accessing of the data-compressed first representation of the set of visual elements includes accessing an octree data structure that includes the parent node and the first and second child nodes; and
in response to the accessing of the octree data structure, the caused rendering of the second representation of the set of visual elements includes a caused rendering of voxels of a three-dimensional volume, each voxel having a different relative location within the three-dimensional volume.

In addition, a seventy-ninth embodiment provides a machine-readable medium (e.g., a non-transitory machine-readable storage medium) comprising instructions that, when executed by one or more processors of a machine, cause the machine to perform operations comprising:
accessing a data-compressed first representation of a set of visual elements by accessing a bounded volume hierarchy in which a parent node represents a subset of the visual elements, the parent node having first and second child nodes and indicating a representative value of an attribute whose values vary among the visual elements, the parent node having a representative child node that indicates a representative offset from the representative value, the first child node indicating a first offset from the representative offset and the second child node indicating a second offset from the representative offset, the representative value being previously generated based on the first, second, and representative offsets collectively indicated by the first, second, and representative child nodes;
performing partial data decompression on the first representation of the set of visual elements by generating a second representation of the set of visual elements based on a portion of the accessed bounded volume hierarchy, in which portion the parent node indicates the representative value that was generated based on the first, second, and representative offsets, the portion of the bounded volume hierarchy omitting the first and second child nodes; and
causing display of the partially decompressed first representation by causing rendering and display of the second representation generated based on the portion of the bounded volume hierarchy.

Furthermore, and eightieth embodiment provides a system (e.g., a computer system comprising:
one or more processors; and
a memory storing instructions that, when executed by at least one processor among the one or more processors, cause the system to perform operations comprising:
accessing a data-compressed first representation of a set of visual elements by accessing a bounded volume hierarchy in which a parent node represents a subset of the visual elements, the parent node having first and second child nodes and indicating a representative value of an attribute whose values vary among the visual elements, the parent node having a representative child node that indicates a representative offset from the representative value, the first child node indicating a first offset from the representative offset and the second child node indicating a second offset from the representative offset, the representative value being previously generated based on the first, second, and representative offsets collectively indicated by the first, second, and representative child nodes;
performing partial data decompression on the first representation of the set of visual elements by generating a second representation of the set of visual elements based on a portion of the accessed bounded volume hierarchy, in which portion the parent node indicates the representative value that was generated based on the first, second, and representative offsets, the portion of the bounded volume hierarchy omitting the first and second child nodes; and
causing display of the partially decompressed first representation by causing rendering and display of the second representation generated based on the portion of the bounded volume hierarchy.

An eighty-first embodiment provides a carrier medium carrying machine-readable instructions for controlling a machine to carry out the method of any of the first through eighteenth embodiments, the twenty-first through thirty-eighth embodiments, the forty-first through fifty-eighth embodiments, or the sixty-first through seventy-eighth embodiments.

What is claimed is:
1. A method comprising:
accessing, by one or more processors of a machine, a set of visual elements that each specify a corresponding value of an attribute;
compressing, by one or more processors of the machine, the set of visual elements by generating a bounded volume hierarchy in which a parent node represents a subset of the visual elements, is associated with first and second child nodes, and indicates a representative value of the attribute, the first child node indicating a first offset from the representative value and the second child node indicating a second offset from the representative value, the representative value being generated based on the first and second offsets;
modifying, by one or more processors of the machine, the bounded volume hierarchy by modifying the representative value based on itself and modifying the first offset based on itself; and
providing, by one or more processors of the machine, a compressed representation of the set of visual elements by providing at least a portion of the modified bounded volume hierarchy.
2. The method of claim 1, wherein:
the modifying of the represented value is performed without influence from the modified first offset.

3. The method of claim 1, wherein:
the modifying of the first offset is performed without influence from the modified representative value.

4. The method of claim 1, wherein:
the modifying of the representative value includes quantizing the representative value; and
the modifying of the first offset includes quantizing the first offset.

5. The method of claim 1, wherein:
the modifying of the generated bounded volume hierarchy includes at least one of:
    setting the representative value to an extremum value based on a comparison of the representative value to a threshold value that indicates a threshold distance from the extremum value, or
    setting the first offset to the extremum value based on a comparison of the first offset to the threshold value that indicates the threshold distance from the extremum value.

6. The method of claim 1, wherein:
the first offset indicates a corresponding absolute deviation in the attribute by the first child node from the parent node.

7. The method of claim 1, wherein:
the first offset indicates a corresponding proportional deviation in the attribute by the first child node from the parent node.

8. The method of claim 1, wherein:
the generating of the bounded volume hierarchy includes averaging a set of offsets indicated by a set of child nodes of the parent node, the set of child nodes including the first and second child nodes; and
the representative value is an average of the set of offsets indicated by the set of child nodes of the parent node.

9. The method of claim 1, wherein:
the generating of the bounded volume hierarchy includes averaging all offsets indicated by all child nodes of the parent node, the child nodes including the first and second child nodes; and
the representative value indicated by the parent node is an average of all offsets indicated by all child nodes of the parent node.

10. The method of claim 1, wherein:
each visual element specifies multiple corresponding values of the attribute within a corresponding vector of ordered values of the attribute;
the parent node indicates a representative vector of ordered representative values of the attribute;
the first child node indicates a first offset vector from the representative vector, the first offset vector including ordered first offset values that each indicate a corresponding deviation from a corresponding one of the ordered representative values;
the second child node indicates a second offset vector from the representative vector, the second offset vector including ordered second offset values that each indicate a corresponding deviation from a corresponding one of the ordered representative values; and
the representative vector is generated based on the first and second offset vectors.

11. The method of claim 10, wherein:
the ordered representative values in the representative vector each correspond to a different camera identifier among a plurality of camera identifiers;
the ordered first offset values each correspond to a different camera identifier among the plurality of camera identifiers; and
the ordered second offset values each correspond to a different camera identifier among the plurality of camera identifiers.

12. The method of claim 10, wherein:
the ordered representative values in the representative vector include reference trios of color space values, each reference trio corresponding to a different camera identifier among a plurality of camera identifiers;
the ordered first offset values include first trios of color offset values, each of the first trios corresponding to a different camera identifier among the plurality of camera identifiers; and
the ordered second offset values include second trios of color offset values, each of the second trios corresponding to a different camera identifier among the plurality of camera identifiers.

13. The method of claim 10, wherein:
the ordered representative values in the representative vector include reference trios of surface normal values, each reference trio defining a different surface normal vector that corresponds to a different camera among a plurality of cameras;
the ordered first offset values include first trios of surface normal offset values, each of the first trios defining a different offset vector that corresponds to a different camera among the plurality of cameras; and
the ordered second offset values include second trios of surface normal offset values, each of the second trios defining a different offset vector that corresponds to a different camera among the plurality of cameras.

14. A non-transitory machine-readable storage medium comprising instructions that, when executed by one or more processors of a machine, cause the machine to perform operations comprising:
accessing a set of visual elements that each specify a corresponding value of an attribute;
compressing the set of visual elements by generating a bounded volume hierarchy in which a parent node represents a subset of the visual elements, is associated with first and second child nodes, and indicates a representative value of the attribute, the first child node indicating a first offset from the representative value and the second child node indicating a second offset from the representative value, the representative value being generated based on the first and second offsets;
modifying the bounded volume hierarchy by modifying the representative value based on itself and modifying the first offset based on itself; and
providing a compressed representation of the set of visual elements by providing at least a portion of the modified bounded volume hierarchy.

15. A system comprising:
one or more processors; and
a memory storing instructions that, when executed by at least one processor among the one or more processors, cause the system to perform operations comprising:
accessing a set of visual elements that each specify a corresponding value of an attribute;
compressing the set of visual elements by generating a bounded volume hierarchy in which a parent node represents a subset of the visual elements, is associated with first and second child nodes, and indicates a representative value of the attribute, the first child node indicating a first offset from the representative value and the second child node indicating a second offset from the representative value, the representative value being generated based on the first and second offsets;

modifying the bounded volume hierarchy by modifying the representative value based on itself and modifying the first offset based on itself; and providing a compressed representation of the set of visual elements by providing at least a portion of the modified bounded volume hierarchy.

16. The system of claim 15, wherein:

the modifying of the generated bounded volume hierarchy includes at least one of:

setting the representative value to an extremum value based on a comparison of the representative value to a threshold value that indicates a threshold distance from the extremum value, or setting the first offset to the extremum value based on a comparison of the first offset to the threshold value that indicates the threshold distance from the extremum value.

17. A method comprising:

accessing, by one or more processors of a machine, a compressed first representation of a set of visual elements by accessing a modified bounded volume hierarchy in which a parent node represents a subset of the visual elements, is associated with first and second child nodes, and indicates a representative value of an attribute, the first child node indicating a first offset from the representative value and the second child node indicating a second offset from the representative value, the representative value being generated based on the first and second offsets and later modified based on itself;

performing, by one or more processors of the machine, partial decompression on the first representation by generating a second representation based on a portion of the modified bounded volume hierarchy, the portion omitting the first and second child nodes; and causing, by one or more processors of the machine, display of the partially decompressed first representation by causing rendering and display of the second representation generated based on the portion of the modified bounded volume hierarchy.

18. The method of claim 17, wherein:

the accessed modified bounded volume hierarchy was modified by at least one of:

the representative value being set to an extremum value based on a pre-modification comparison of the representative value to a threshold value that indicates a threshold distance from the extremum value, or the first offset being set to the extremum value based on a pre-modification comparison of the first offset to the threshold value that indicates the threshold distance from the extremum value.

19. A non-transitory machine-readable storage medium comprising instructions that, when executed by one or more processors of a machine, cause the machine to perform operations comprising:

accessing a compressed first representation of a set of visual elements by accessing a modified bounded volume hierarchy in which a parent node represents a subset of the visual elements, is associated with first and second child nodes, and indicates a representative value of an attribute, the first child node indicating a first offset from the representative value and the second child node indicating a second offset from the representative value, the representative value being generated based on the first and second offsets and later modified based on itself;

performing partial decompression on the first representation by generating a second representation based on a portion of the modified bounded volume hierarchy, the portion omitting the first and second child nodes; and causing display of the partially decompressed first representation by causing rendering and display of the second representation generated based on the portion of the modified bounded volume hierarchy.

20. A system comprising:

one or more processors; and a memory storing instructions that, when executed by at least one processor among the one or more processors, cause the system to perform operations comprising:

accessing a compressed first representation of a set of visual elements by accessing a modified bounded volume hierarchy in which a parent node represents a subset of the visual elements, is associated with first and second child nodes, and indicates a representative value of an attribute, the first child node indicating a first offset from the representative value and the second child node indicating a second offset from the representative value, the representative value being generated based on the first and second offsets and later modified based on itself, performing partial decompression on the first representation by generating a second representation based on a portion of the modified bounded volume hierarchy, the portion omitting the first and second child nodes; and causing display of the partially decompressed first representation by causing rendering and display of the second representation generated based on the portion of the modified bounded volume hierarchy.

* * * * *

UNITED STATES PATENT AND TRADEMARK OFFICE
CERTIFICATE OF CORRECTION

PATENT NO. : 10,140,729 B2
APPLICATION NO. : 15/851012
DATED : November 27, 2018
INVENTOR(S) : Higgs et al.

Page 1 of 2

It is certified that error appears in the above-identified patent and that said Letters Patent is hereby corrected as shown below:

In the Specification

In Column 7, Line 6, delete "hierarchy."" and insert --hierarchy,"-- therefor

In Column 7, Line 65, delete "value" and insert --volume-- therefor

In Column 19, Line 13, after "optical", insert --,--

In Column 21, Line 64, delete "herein." and insert --herein,-- therefor

In Column 22, Line 59, delete ""data."" and insert --"data,"-- therefor

In Column 22, Line 60, delete ""terms."" and insert --"terms,"-- therefor

In Column 22, Line 60, delete ""numerals."" and insert --"numerals,"-- therefor

In Column 22, Line 64, delete ""processing."" and insert --"processing,"-- therefor In Column 22, Line 65, delete ""computing." "calculating."" and insert --"computing," "calculating,"-- therefor In Column 24, Line 52, delete "attribute:" and insert --attribute;-- therefor In Column 36, Line 9, delete "value:" and insert --value;-- therefor In Column 36, Line 61, delete "elements:" and insert --elements;-- therefor In Column 40, Line 12, delete "identifiers:" and insert --identifiers;-- therefor Signed and Sealed this
Thirtieth Day of July, 2019

Andrei Iancu
*Director of the United States Patent and Trademark Office*

CERTIFICATE OF CORRECTION (continued)
U.S. Pat. No. 10,140,729 B2

In Column 40, Line 16, delete "identifiers:" and insert --identifiers;-- therefor In Column 40, Line 65, delete "movement:" and insert --movement;-- therefor In the Claims In Column 46, Line 40, in Claim 20, delete "itself," and insert --itself;-- therefor